(12) United States Patent
Shibaike et al.

(10) Patent No.: US 11,070,714 B2
(45) Date of Patent: Jul. 20, 2021

(54) INFORMATION PROCESSING APPARATUS AND INFORMATION PROCESSING METHOD

(71) Applicant: SONY CORPORATION, Tokyo (JP)

(72) Inventors: Yuko Shibaike, Saitama (JP); Yoshimi Tsuboi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 16/481,997

(22) PCT Filed: Feb. 9, 2018

(86) PCT No.: PCT/JP2018/004673
§ 371 (c)(1),
(2) Date: Jul. 30, 2019

(87) PCT Pub. No.: WO2018/155242
PCT Pub. Date: Aug. 30, 2018

(65) Prior Publication Data
US 2019/0394405 A1    Dec. 26, 2019

(30) Foreign Application Priority Data
Feb. 22, 2017  (JP) .............................. JP2017-030951

(51) Int. Cl.
*H04N 5/232*    (2006.01)
(52) U.S. Cl.
CPC ... *H04N 5/232061* (2018.08); *H04N 5/23245* (2013.01); *H04N 5/232933* (2018.08)

(58) Field of Classification Search
CPC ....... H04N 5/232061; H04N 5/232933; H04N 5/23245
See application file for complete search history.

(56) References Cited

U.S. PATENT DOCUMENTS

| 2001/0048815 A1* | 12/2001 | Nakajima | .............. G03B 17/24 396/310 |
| 2014/0049652 A1* | 2/2014 | Moon | ................ H04N 5/23229 348/207.1 |
| 2015/0296134 A1* | 10/2015 | Cudak | ................ H04N 5/23222 348/207.1 |

FOREIGN PATENT DOCUMENTS

| JP | 2008-005034 A | 1/2008 |
| JP | 2012-124575 A | 6/2012 |
| JP | 2016-174260 A | 9/2016 |

OTHER PUBLICATIONS

International Search Report and Written Opinion of PCT Application No. PCT/JP2018/004673, dated Apr. 17, 2018, 08 pages of ISRWO.

* cited by examiner

*Primary Examiner* — Nicholas G Giles
(74) *Attorney, Agent, or Firm* — Chip Law Group

(57) ABSTRACT

There is provided an information processing apparatus in which, on the basis of a pre-registered setting change position and/or pre-registered setting change time, a setting of the imaging apparatus is changed to a pre-registered setting associated with the setting change position and/or the setting change time.

15 Claims, 13 Drawing Sheets

| SETTING CHANGE POSITION | SETTING CHANGE TIME | SETTING INFORMATION |
|---|---|---|
| POSITION B | 0:15:200 | SET CAMERA SHAKE CORRECTION TO STRONG |
| POSITION C | 0:17:000 | SET CAMERA SHAKE CORRECTION TO WEAK |
| POSITION D | 0:30:017 | CHANGE ZOOM SETTING AND FOCUS SETTING |
| POSITION E | 1:00:000 | CHANGE EXPOSURE AND WB TO INDOOR SETTING |
| POSITION F | 1:30:500 | CHANGE EXPOSURE AND WB TO OUTDOOR SETTING |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/004673 filed on Feb. 9, 2018, which claims priority benefit of Japanese Patent Application No. JP 2017-030951 filed in the Japan Patent Office on Feb. 22, 2017. Each of the above-referenced applications is hereby incorporated herein by reference in its entirety.

TECHNICAL FIELD

The present technology relates to an information processing apparatus, an information processing method, and an information processing program.

BACKGROUND ART

In shooting performed using an imaging apparatus, a setting of the imaging apparatus is switched depending on the position of a camera, shooting environments, or the like.

Thus, there has been proposed a shooting condition setting system in which an attraction of a theme park is set as a specific access point and wireless connection to the access point is provided such that an optimum setting is automatically set in a vicinity of the position where the access point is installed (Patent Document 1).

CITATION LIST

Patent Document

Patent Document 1: Japanese Patent Application Laid-Open No. 2008-5034

SUMMARY OF THE INVENTION

Problems to be Solved by the Invention

However, in shooting a movie film, a drama, or the like, it is necessary to change the optimum setting of a camera depending on not only the position, but also a lapse of time during shooting or the like.

The present technology has been made in view of such a problem, and it is an object of the present technology to provide an information processing apparatus, an information processing method, and an information processing program in which a setting of an imaging apparatus can easily be changed on the basis of the position of the imaging apparatus during shooting and time in shooting.

Solutions to Problems

In order to solve the aforementioned problem, a first technology is an information processing apparatus in which, on the basis of a pre-registered setting change position and/or pre-registered setting change time, a setting of the imaging apparatus is changed to a pre-registered setting associated with the setting change position and/or the setting change time.

Furthermore, a second technology is an information processing method including: changing, on the basis of a pre-registered setting change position and/or pre-registered setting change time, a setting of the imaging apparatus to a pre-registered setting associated with the setting change position and/or the setting change time.

Moreover, a third technology is an information processing program causing a computer to execute an information processing method that changes, on the basis of a pre-registered setting change position and/or pre-registered setting change time, a setting of the imaging apparatus to a pre-registered setting associated with the setting change position and/or the setting change time.

Effects of the Invention

According to the present technology, it is possible to easily change the setting of an imaging apparatus on the basis of the position of the imaging apparatus and time during shooting. Note that effects described herein are not necessarily limited, but may also be any of those described in the specification.

MODE FOR CARRYING OUT THE INVENTION

Embodiments of the present technology are described below with reference to the drawings. Note that description will be presented in the following order.

<1. First Embodiment>
  [1-1. Configuration of information processing apparatus and imaging apparatus]
  [1-2. Registration processing]
  [1-3. Setting change processing of imaging apparatus]
<2. Second Embodiment>
  [2-1. Registration processing]
<3. Third Embodiment>
  [3-1. Setting change processing of imaging apparatus]
<4. Fourth Embodiment>
  [4-1. Setting change processing of imaging apparatus]
<5. User interface>
<6. Modification>
<7. Application example>

1. First Embodiment

[1-1. Configuration of Information Processing Apparatus and Imaging Apparatus]

Figure 1:
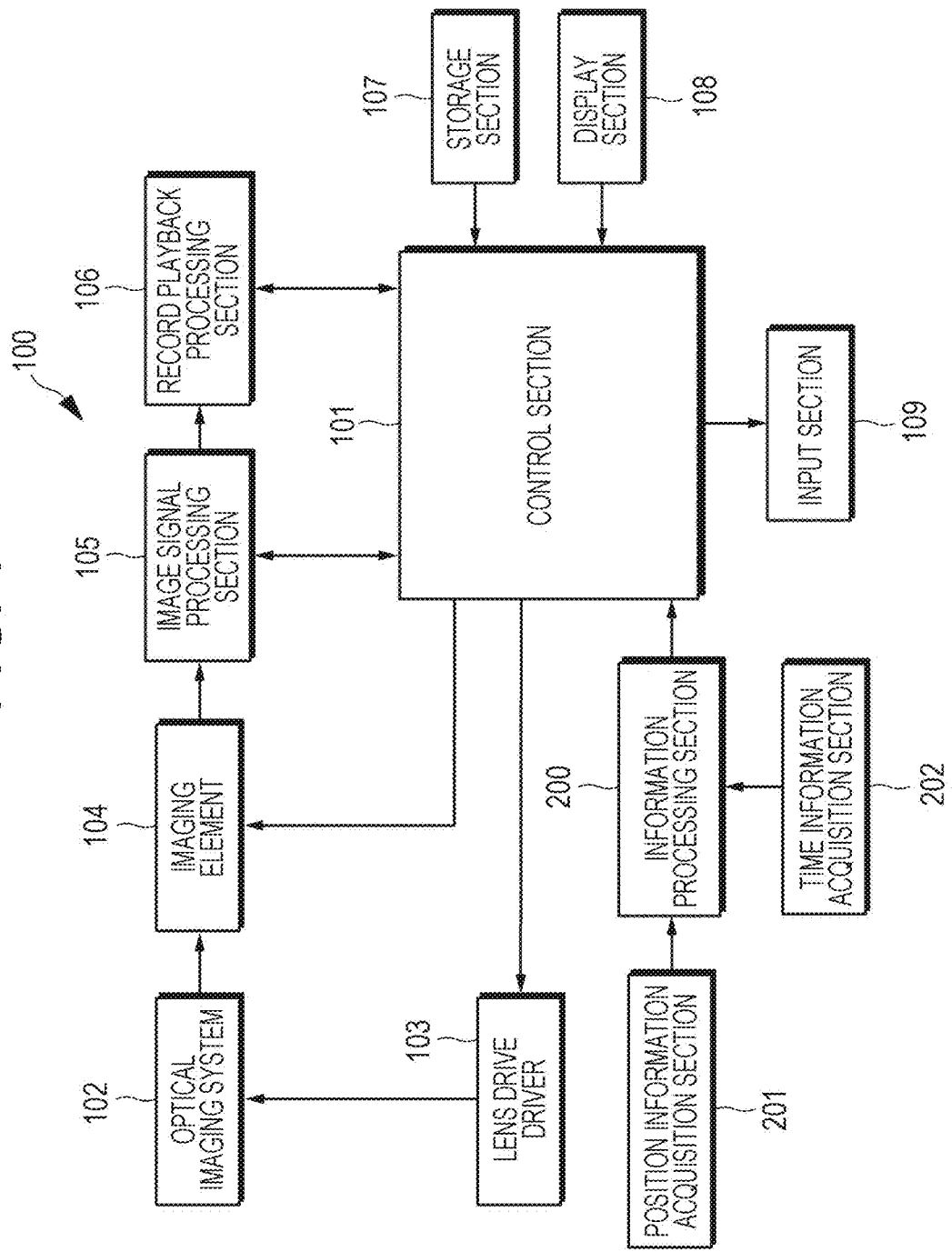
FIG. 1 is a block diagram illustrating a configuration of an information processing apparatus and an imaging apparatus according to the present technology.
Figure 2:
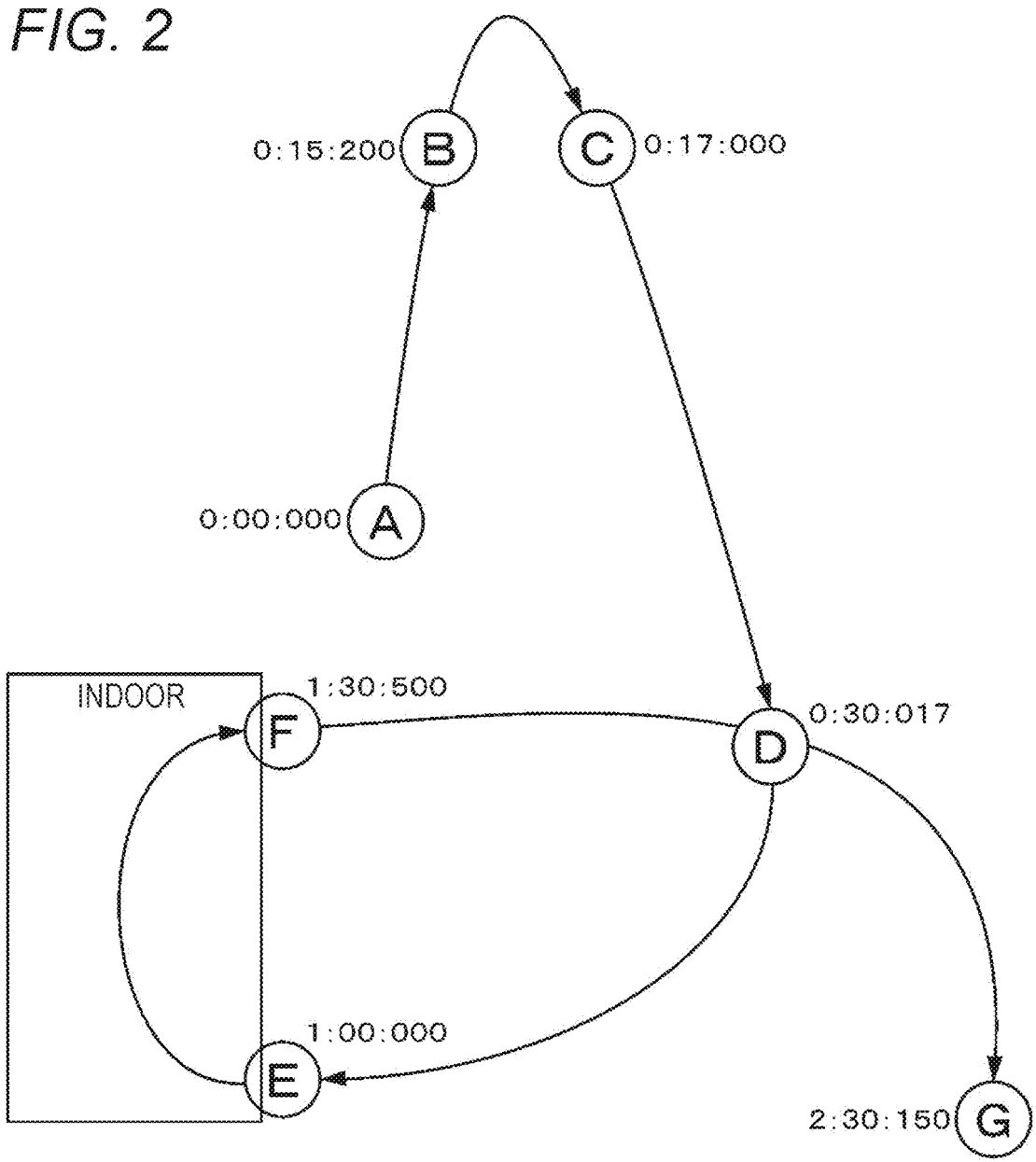
FIG. 2 is a diagram illustrating setting change positions, setting change time, and an overview of setting changes of an imaging apparatus.

First, a configuration of an imaging apparatus 100 having a function of an information processing apparatus according to a first embodiment is described. FIG. 1 is a block diagram illustrating a configuration of an information processing section 200 as an information processing apparatus and the imaging apparatus 100. FIG. 2 is a schematic diagram illustrating an example of a movement course of the imaging apparatus 100 during actual shooting. In the description of the present example, shooting is performed in this way.

The imaging apparatus 100 includes a control section 101, an optical imaging system 102, a lens drive driver 103, an imaging element 104, an image signal processing section 105, a record playback processing section 106, a storage section 107, a display section 108, an input section 109, an information processing section 200, a position information acquisition section 201, and a time information acquisition section 202.

The control section 101 includes a central processing unit (CPU), a random access memory (RAM), a read only memory (ROM), or the like. The ROM stores a program or the like that is read and operated by the CPU. The RAM is used as a work memory of the CPU. The CPU executes various processing according to a program stored in the ROM and issues a command to generally control the imaging apparatus 100.

The optical imaging system 102 includes a shooting lens for condensing light from a subject into the imaging element 104, a drive mechanism, a shutter mechanism, an iris mechanism and the like that move the shooting lens and perform focusing or zooming. These are driven on the basis of a control signal from the control section 101. An optical image of the subject obtained via the optical imaging system 102 is formed on the imaging element 104, which is an imaging device.

The lens drive driver 103 includes, for example, a microcomputer, and moves the shooting lens a predetermined amount along an optical axis direction under control by the control section 101 so as to perform autofocus to focus on the subject, which is a target. Furthermore, under control by the control section 101, the operations of the drive mechanism, the shutter mechanism, the iris mechanism and the like of the optical imaging system 102 are controlled. Thus, exposure time (shutter speed) is adjusted, and an aperture value (F value) or the like is adjusted.

The imaging element 104 photoelectrically converts incident light from the subject into an electric charge and outputs a pixel signal. Then, the imaging element 104 eventually outputs an imaging signal including the pixel signal to the image signal processing section 105. As the imaging element 104, a charge coupled device (CCD), a complementary metal oxide semiconductor (CMOS), or the like is used.

The image signal processing section 105 performs sample and hold for keeping signal/noise (S/N) ratio favorable by correlated double sampling (CDS), auto gain control (AGC) processing, analog/digital (A/D) conversion, or the like on the imaging signal output from the imaging element 104 so as to generate an image signal.

Furthermore, the image signal processing section 105 may perform predetermined signal processing on the image signal, including demosaic processing, white balance adjustment processing, color correction processing, gamma correction processing, Y/C conversion processing, auto exposure (AE) processing, resolution conversion processing, or the like.

The record playback processing section 106 performs, for example, encoding processing and decoding processing for record or communication with regard to still image data and moving image data to which the predetermined processing has been performed. The still image data and the moving image data to which the processing has been performed are stored in the storage section 107 and displayed on the display section 108.

The storage section 107 is, for example, a large capacity storage medium, e.g., a hard disk or an SD memory card. The image is stored in a compressed state on the basis of a standard, for example, joint photographic experts group (JPEG). Furthermore, exchangeable image file format (EXIF) data including information associated with the stored image and additional information, e.g., date and time of imaging, is also stored in association with the image. A video is stored, for example, in format of moving picture experts group 2 (MPEG2) or MPEG 4.

The display section 108 is a display device including, for example, a liquid crystal display (LCD), a plasma display panel (PDP), an organic electro luminescence (EL) panel, or the like. The display section 108 displays a user interface of the imaging apparatus 100, a menu screen, a monitoring image during imaging, a shot image or a shot video recorded on the storage section 107, or the like.

The input section 109 is to input an imaging instruction, a setting change, or the like to the imaging apparatus 100. When input is given to the input section 109 by the user, a control signal corresponding to the input is generated and output to the control section 101. Then, the control section 101 performs arithmetic processing corresponding to the control signal or control of the imaging apparatus 100. The input section 109 includes hardware buttons, e.g., a release button, a shooting start instruction button, a power button for switching power on/off, a zoom adjustment operator, and a touch panel integral with the display section 108.

Note that, in the present technology, instructions for registering setting change position, setting change time, and setting information of the imaging apparatus 100 by the user are performed by input to the input section 109. Details will be described later. The control signal corresponding to the input is fed to the information processing section 200.

The position information acquisition section 201 includes a global positioning system (GPS) or simultaneous localization and mapping (SLAM) function, and, for example, acquires the position of the imaging apparatus 100 as coordinate information and feeds the coordinate information to the information processing section 200. Note that the position information acquisition section 201 may have a function of grasping the height of the imaging apparatus 100. The position information acquisition section 201 may invariably feed the position information of the imaging apparatus 100 to the information processing section 200 or may feed the position information in response to a request from the information processing section 200.

The time information acquisition section 202 has a timer function to measure an elapsed time from shooting start time and feed the elapsed time to the information processing section 200. The time information acquisition section 202 may invariably feed time information to the information processing section 200 or may feed the time information in response to a request from the information processing section 200.

The information processing section 200 performs processing of changing the setting of the imaging apparatus (setting change processing) on the basis of pre-registered setting information. The information processing section 200 registers and stores a setting of the imaging apparatus 100, which is input from the user at a preparation stage (hereinafter the rehearsal) before actual shooting, as the setting information. Furthermore, the information processing section 200 registers and stores setting change position and setting change time in response to a registration instruction given in the rehearsal from the user. The setting information, the setting change position, and the setting change time are associated and stored. Note that the information processing section 200 may have a buffer memory or the like such that the information processing section 200 itself stores the setting information, the setting change position, and the setting change time, or a storage apparatus of the imaging apparatus 100 or an external storage apparatus may store them. The information processing section 200 corresponds to an information processing apparatus in the claims.

The setting information of the imaging apparatus 100 includes, for example, on/off of camera shake correction, degree, e.g., level, of camera shake correction, shutter speed, ISO sensitivity, aperture value, a built-in ND filter, focus zoom setting, white balance setting, frame rate setting, or the like. In addition, anything that is a parameter of the imaging apparatus 100 and can be changed by the user is possible.

The setting change position is a position at which the setting of the imaging apparatus 100 on a shooting course on which the imaging apparatus 100 moves in actual shooting is changed as illustrated in FIG. 2. The information processing section 200 determines whether the imaging apparatus 100 has reached the setting change position on the basis of the position information of the imaging apparatus 100 fed from the position information acquisition section 201.

The setting change time is an elapsed time from shooting start time in actual shooting corresponding to the setting change position illustrated in FIG. 2. The setting change time is an elapsed time from shooting start time 0:00:000. The information processing section 200 determines whether the present has reached the elapsed time from the shooting start time, which is the setting change time, on the basis of the time information fed from the time information acquisition section 202. In a case where the imaging apparatus 100 reaches the setting change position at a point of time when the setting change time is reached, the information processing section 200 performs the setting change processing. The setting change processing is processing for changing the setting of the imaging apparatus 100 to a setting of the imaging apparatus 100 indicated by the setting information, which is preliminarily registered by the user. For example, in a case where the pre-registered setting information is camera shake correction on, and in a case where the imaging apparatus 100 reaches the setting change position at a point of time when the elapsed time from shooting start time reaches the setting change time in actual shooting, the camera shake correction is automatically switched from an off state to an on state by the setting change processing.

Note that, in the example of FIG. 2, shooting starts at shooting start position A and ends at shooting end position G via position B, position C, position D, position E, and position F. FIG. 2 illustrates shooting start time 0:00:00 from shooting start position A and elapsed times to reach each position from shooting start position A.

In the example of FIG. 2, the degree of camera shake correction is changed to strong at position B, the degree of camera shake correction is changed to weak at position C, and zoom setting and focus setting are changed such that a person, who is a subject, is zoomed at position D. Furthermore, the zoom setting and the focus setting are changed back to normal at position E and moreover, because of entry from outdoors to indoors, an exposure and white balance setting is changed to an indoor setting, and because of leaving from indoors to outdoors at position F, the exposure and white balance setting is changed to an outdoor setting. Then, shooting ends at shooting end position G. The setting of the imaging apparatus 100 from shooting start position A to shooting end position G is a mere example set for the sake of explanation and is not limited to this description.

Note that the setting change processing may be executed under an instruction of the information processing section 200 by the control section 101 which has received the feed of the setting information from the information processing section 200.

The information processing section 200 includes a program, which program may be pre-installed in the imaging apparatus 100 or may be distributed through download or via a storage medium and installed by the user itself. The control section 101 may function as the information processing section 200 as the control section 101 executes the program. Furthermore, the information processing section 200 is not only achieved by the program, but may be achieved by a combination of a dedicated apparatus, circuit, and the like of hardware having the function of the program.

The information processing section 200 as the information processing apparatus, and the imaging apparatus 100 are configured in the manner described above.

[1-2. Registration Processing]

Figure 3:
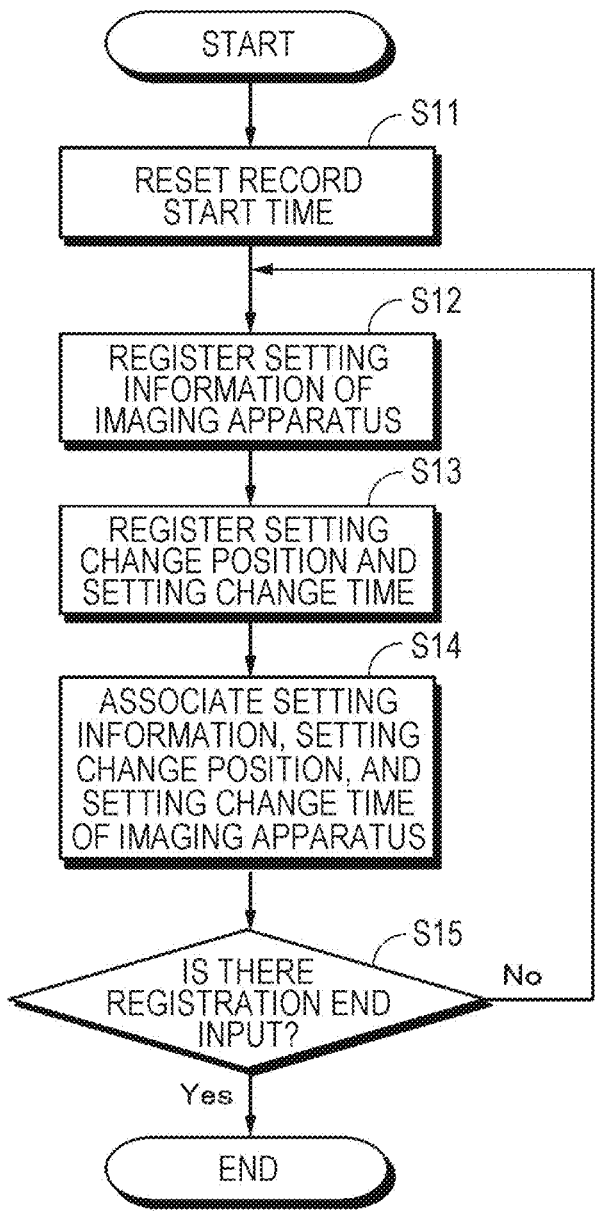
FIG. 3 is a flowchart illustrating a flow of registration processing.

Next, referring to FIGS. 2 and 3, the registration processing for the setting information, the setting change position, and the setting change time of the imaging apparatus 100 by the information processing section 200 (hereinafter, the registration processing) is described. FIG. 3 is a flowchart illustrating a flow of the registration processing.

The registration processing illustrated in the flowchart of FIG. 3 is performed at a preparation stage (rehearsal) before actual shooting. This registration processing is performed while a camera man or assistant (hereinafter the user) who performs shooting with the imaging apparatus 100 moves on foot or the like on a shooting course in practice while holding the imaging apparatus 100.

First, the shooting start time is reset to 0:00:00 in step S11. The setting change time to be registered is based on record start time 0:00:00. Therefore, it is necessary to once set the reference time to 0:00:00 at the time of the registration processing.

Next, in step S12, setting content of the imaging apparatus 100 changed at position B is accepted and registered as the setting information. The setting content of the imaging apparatus 100 is fed to the information processing section 200 through input by the user to the input section 109. In the example of FIG. 2, an abrupt direction change is present between position B and position C. Therefore, the degree of camera shake correction is set to strong at position B.

Next, in step S13, when a registration instruction of the setting change position and the setting change time is given from the user, the position of the imaging apparatus 100 at that point of time is registered as the setting change position. In the example of FIG. 2, as a result of that the user gives a registration instruction at a point of time when the imaging apparatus 100 reaches position B, position B is registered as the setting change position and moreover an elapsed time (0:15:200) for reaching position B from shooting start position A is registered as the setting change time. The time elapsed for reaching position B from shooting start position A in the rehearsal directly becomes the elapsed time to reach position B from record start time in actual shooting. In this way, the setting change position and the setting change time are registered simultaneously. Therefore, for the registration instruction by the user, it is not necessary to distinguish an instruction for registering the setting change position from an instruction for registering the setting change time. For example, it is sufficient if both the setting change position and the setting change time are registered by a single time pressing of the button, which is the input section 109 of the imaging apparatus 100.

Then, in step S14, the setting change position and the setting change time registered in step S13 are associated with the setting information registered in step S12. Thus, the content "the degree of camera shake correction of the imaging apparatus 100 is changed to strong after 15.200 seconds from shooting start time at position B" is registered. The processing of this step S14 may be performed by receiving the instruction from the user or may automatically be performed at a point of time when the setting information, the setting change position, and the setting change time are registered.

Next, whether input of registration end has been made is determined in step S15. In a case where the input of registration end has not been performed, the processing returns to step S12, and steps S12 to S15 are repeated until the input of registration end is performed.

Next, after setting for turning the degree of camera shake correction to weak is registered in step S12, the user moves the imaging apparatus 100 from position B to position C and gives a registration instruction at a point of time when position C is reached. Thus, position C is registered as the setting change position in step S13, and time (0:17:000) for reaching position C from record start time is also registered as the setting change time. Thus, in step S14, the content in which the degree of camera shake correction of the imaging apparatus 100 is changed to normal after 17.000 seconds from shooting start time at position C is registered.

Next, after the zoom setting and the focus setting for zooming to the subject are registered in step S12, the user moves the imaging apparatus 100 from position C to position D and gives a registration instruction at a point of time when position D is reached. Thus, position D is registered as the setting change position in step S13, and time (0:30:017) for reaching position D from record start time is also registered as the setting change time. Thus, in step S14, the content in which the zoom setting and the focus setting of the imaging apparatus 100 are changed after 30.017 seconds from shooting start time at position D is registered.

Next, after a change of the exposure and white balance setting to an indoor setting is registered in step S12, the user moves the imaging apparatus 100 from position D to position E and gives a registration instruction at a point of time when position E is reached. Thus, position E is registered as the setting change position in step S13, and time (1:00:000) for reaching position E from record start time is also registered as the setting change time. Thus, in step S14, the content in which the exposure and white balance setting of the imaging apparatus 100 is changed to an indoor setting after one minutes and 00.000 seconds from shooting start time at position E is registered.

Next, after a change of the exposure and white balance setting to an outdoor setting is registered in step S12, the user moves the imaging apparatus 100 from position E to position F and gives a registration instruction at a point of time when position F is reached. Thus, position F is registered as the setting change position in step S13, and time (1:30:500) for reaching position F from record start time is also registered as the setting change time. Thus, in step S14, the content in which the exposure and white balance setting of the imaging apparatus 100 is changed to an outdoor setting after one minutes and 30.017 seconds from shooting start time at position E is stored.

Then, the registration processing is ended when the input of registration end is given from the user at shooting end position G. In a case of the first aspect of the registration processing, it is necessary for the user to reach the same position in the rehearsal as in the case of actual shooting at the same elapsed time from shooting start time, and register the setting change position and the setting change time.

Thus, the registration processing at the preparation stage (rehearsal) before actual shooting is performed.

[1-3. Setting Change Processing of Imaging Apparatus]

Figure 4:
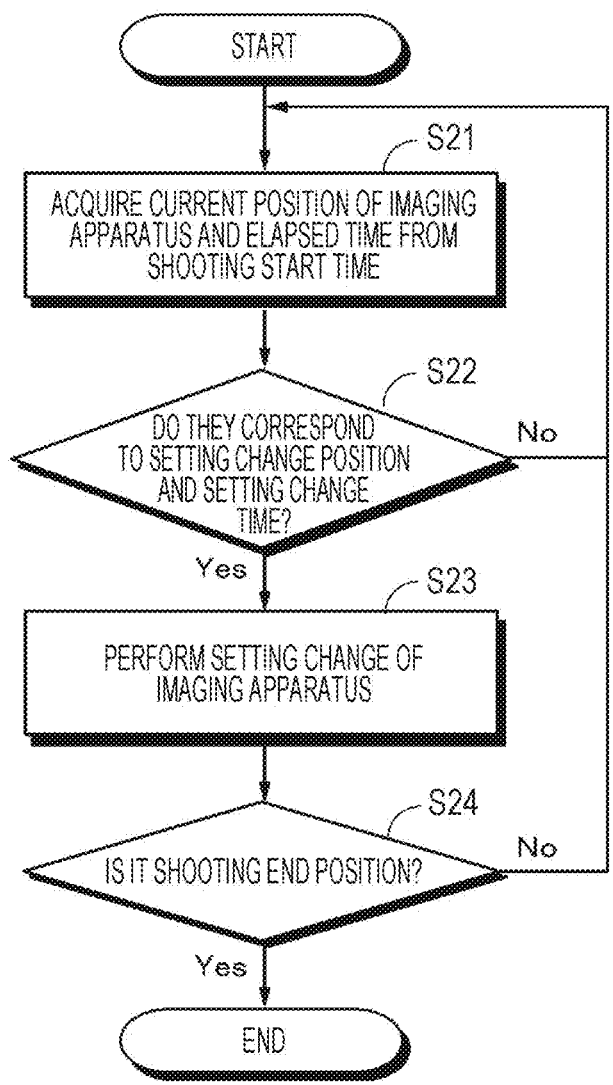
FIG. 4 is a flowchart illustrating a flow of setting change processing.

Next, the setting change processing of the imaging apparatus 100 in actual shooting is described with reference to the flowchart of FIG. 4. This processing is performed by the information processing section 200.

First, in step S21, the information processing section 200 acquires the current position of the imaging apparatus 100 and the elapsed time from shooting start time. The current position of the imaging apparatus 100 can be obtained as position information from the position information acquisition section 201. Furthermore, the elapsed time from shooting start time can be obtained as time information from the time information acquisition section 202.

Next, in step S22, it is determined whether the current position of the imaging apparatus 100 acquired in step S21 corresponds to the setting change position (the imaging apparatus 100 reaches the setting change position) and the elapsed time from shooting start time corresponds to the setting change time (setting change time is reached). In a case of no correspondence, the processing returns to step S21, and steps S21 and S22 are repeated until correspondence is obtained (No in step S22).

In a case where it is determined that the current position of the imaging apparatus 100 has reached the setting change position and the elapsed time from shooting start time has reached the setting change time in step S22, the processing proceeds to step S23 (Yes in step S22).

Then, the setting change processing is performed in step S23, and the setting of the imaging apparatus 100 is changed to the pre-registered setting. In the example of FIG. 2 described above, in a case where the imaging apparatus 100 reaches position B after 0:15:200 seconds from shooting start time, the degree of camera shake correction is changed to strong.

Next, in step S24, it is determined whether or not the position acquired in step S21 is shooting end position. In a case where it is not the shooting end position, the processing proceeds to step S21, and steps S21 to S24 are repeated up to the shooting end position (No in step S24). Meanwhile, in a case where the position acquired in step S21 is the shooting end position, the processing ends (Yes in step S24).

Thus, the setting change processing of the imaging apparatus 100 by the information processing apparatus is performed. In actual shooting in practice, the user starts shooting at shooting start position A, and when the setting change position is reached at a point of time when the elapsed time from shooting start time reaches the setting change time, the information processing section 200 changes the setting of the imaging apparatus 100 to a setting corresponding to the setting change position and the setting change time without a need of particular instructions from the user. In this way, at the time of actual shooting, the user is not required to operate the imaging apparatus 100 to perform setting changes and therefore can concentrate on movement of the imaging apparatus 100, adjustment of the camera angle, and the like.

Furthermore, even in a case where scenes in which an appropriate setting of the imaging apparatus 100 varies are continuously shot in shooting stories such as a movie film or a drama, the setting of the imaging apparatus 100 can be changed to an appropriate setting in every scene even without particular input instructions during shooting. Furthermore, the setting of the imaging apparatus 100 can be changed properly to correspond to shooting at a position where a shooting environments abruptly change drastically. Furthermore, if the number of settings of the imaging apparatus 100 to be changed at one position is two or more, a plurality of settings can be changed simultaneously without any operations on the imaging apparatus 100, and even shooting that cannot be made by human manual operations can be achieved. Furthermore, changes of the camera setting corresponding to the pre-registered position information and time information can be executed any number of times in actual shooting, and therefore can be reproduced any number of times.

Note that position D in the example of FIG. 2 is reached twice: from position C and from position F. However, because position D is associated with the setting change time as the setting change position, the setting change processing is not performed at the second time (from position F) because of lack of correspondence of the setting change time. Thus, the setting change processing is not performed in error even when the imaging apparatus 100 reaches the same position.

Furthermore, each setting change position may be associated with the movement course information of the imaging apparatus 100 such that the setting change processing is performed only in a case where position D is reached from position C.

1. Second Embodiment

[2-1. Registration Processing]

Figure 5:
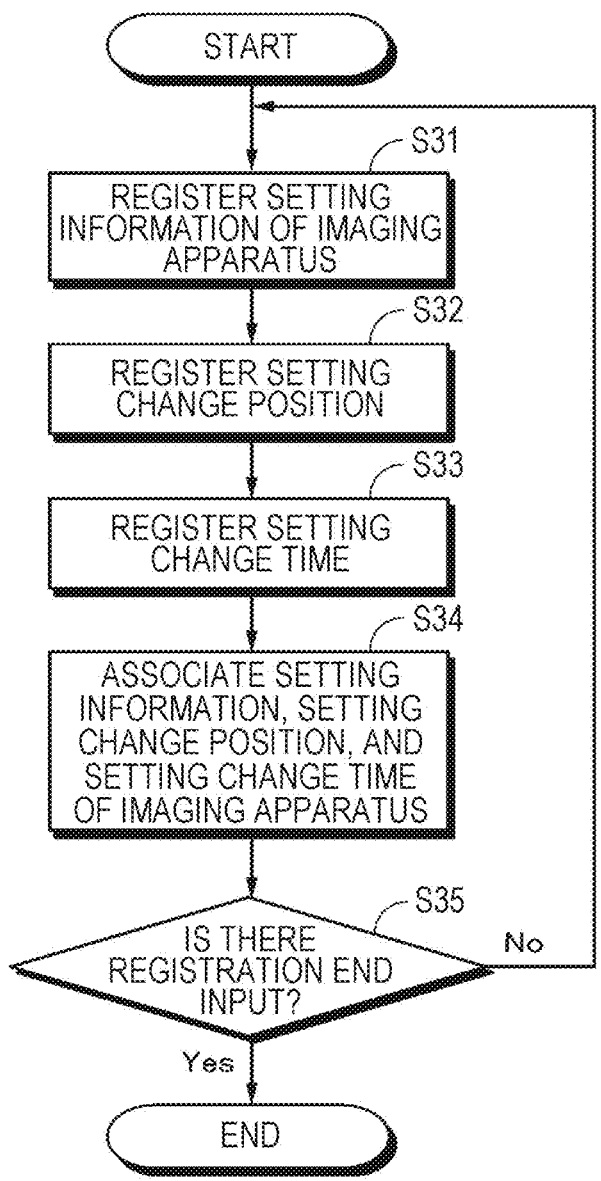
FIG. 5 is a flowchart illustrating a flow of registration processing in a second embodiment.

Next, with reference to the flowchart of FIG. 5, a second aspect of the registration processing of the setting information, the setting change position, and the setting change time is described. This processing is performed by the information processing section 200. Similarly to the first embodiment, the registration processing illustrated in the flowchart of FIG. 5 is performed at a preparation stage (rehearsal) before actual shooting. This registration processing is performed while the user who performs shooting with the imaging apparatus 100 practically moves on foot or the like on a shooting course. Note that, for the processing similar to that of the flowchart of FIG. 3, the same explanation is cited, and a detailed explanation will be omitted.

First, in step S31, the setting of the imaging apparatus 100 changed at a next setting change position is accepted from the user and registered as the setting information. This is processing similar to that of step S12 of the first embodiment. Next, in step S32, when a registration instruction of the setting change position is given from the user, the position of the imaging apparatus 100 at that point of time is registered as the setting change position. Similarly to the first embodiment, this setting change position is the setting change position.

Next, in step S33, as the setting change time corresponding to the setting change position registered in step S32 described above, input of the elapsed time from record start time is accepted. This input is made when the user inputs specific time in numerical value to the input section 109. In this point, the second aspect differs from the first aspect. In the first aspect, registration instructions of the setting change position and the setting change time are performed simultaneously in step S13. However, in the second embodiment, the setting change position and the setting change time are registered separately.

This is effective in a case where it is difficult to reach each setting change position to give a registration instruction of the setting change time in rehearsal at a timing similar to that of actual shooting. Because the setting change position and the setting change time are registered separately, it is not necessary to pay attention to the elapsed time from shooting start time in registering the setting change position by moving the imaging apparatus 100, and it is possible to register the setting change position while performing discussion, an adjustment change of the position, or the like. Then, the setting change position is registered and then the setting change time corresponding to each setting change position is registered. In this way, similarly to the first aspect, the setting change position, the setting change time, and the setting information are associated and registered ultimately.

Then, in step S34, the setting information registered in step S31 is associated with the setting change position and the setting change time registered in steps S32 and S33.

Next, whether the input of registration end has been made is determined in step S35. In a case where the input of registration end is performed, the processing ends (Yes in step S35). Meanwhile, in a case where the input of registration end has not been performed, the processing returns to step S31, and steps S31 to S35 are repeated until the input of registration end is performed.

The registration processing in the second embodiment is performed in the above manner. According to the second embodiment, the setting change position and the setting change time are registered separately. Therefore, it is possible to first register the setting change position while moving the imaging apparatus 100 on the practical shooting course in rehearsal, and then register the setting change time without moving the imaging apparatus 100. Thus, the setting change time can be registered even in a case where the imaging apparatus 100 cannot be moved between setting change positions with the elapsed time similar to that in the actual shooting. Furthermore, in a case where the setting change time cannot be registered in rehearsal, the setting change time can be registered later. Moreover, in a case where the setting change time is not determined in rehearsal, only the setting change position can be registered in advance. Discussions may be made after the setting change position is registered, and then the setting change time may be registered in more detail.

3. Third Embodiment

[3-1. Setting Change Processing of Imaging Apparatus]

Next, the third embodiment of the present technology is described. The third embodiment is associated with the setting change processing in actual shooting. Note that the setting information, the setting change position, and the setting change time of the imaging apparatus 100 in preliminary rehearsal may be registered in either the first embodiment or the second embodiment.

The third embodiment differs from the first and second embodiments in that the third embodiment has a range in the setting change position and/or the setting change time.

Figure 6:
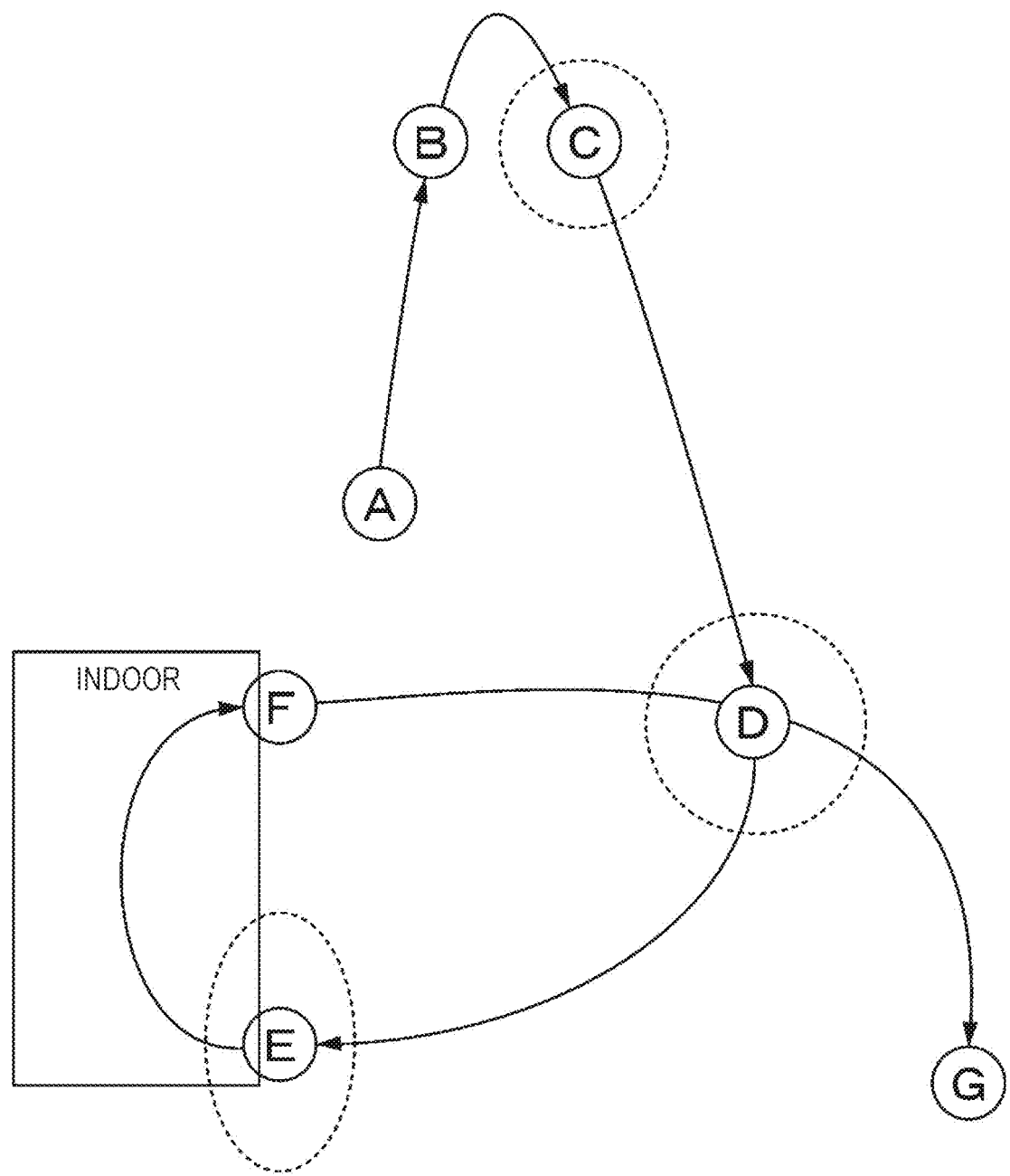
FIG. 6 is an explanatory diagram of setting change positions in a third embodiment.

In the third embodiment, a region including the setting change position is provided. The setting change position is reached in a case where the imaging apparatus 100 reaches anywhere in the region. In the example illustrated in FIG. 6, as indicated by the dotted lines, there are provided a region including position C, a region including position D, and a region including position E.

Furthermore, the setting change time has elapsed in a case where the setting change position has been reached in a predetermined period of time including the elapsed time from shooting start time as the setting change time. The phrase "in a predetermined period of time including the elapsed time from shooting start time" indicates, for example, ±2 seconds in a case where the elapsed time from shooting start time is 15 seconds, i.e., between 13 seconds and 17 seconds from shooting start time.

In this way, when the setting change position and the setting change time have a range, even if an error occurs between the movements of the imaging apparatus 100 in rehearsal and actual shooting, such an error is permitted and the setting change processing can be executed. Note that the size of the region including the setting change position may automatically be set to a specific size, or any size may be set by input by the user. Furthermore, the predetermined period of time including the elapsed time from shooting start time as the setting change time may automatically be set to a specific period of time, or any setting may be made by input by the user. Moreover, the size of the region including the setting change position may be set to any size with respect to each setting change position. The predetermined period of time including the elapsed time from shooting start time as the setting change time may also be set arbitrarily by the user.

Figure 7:
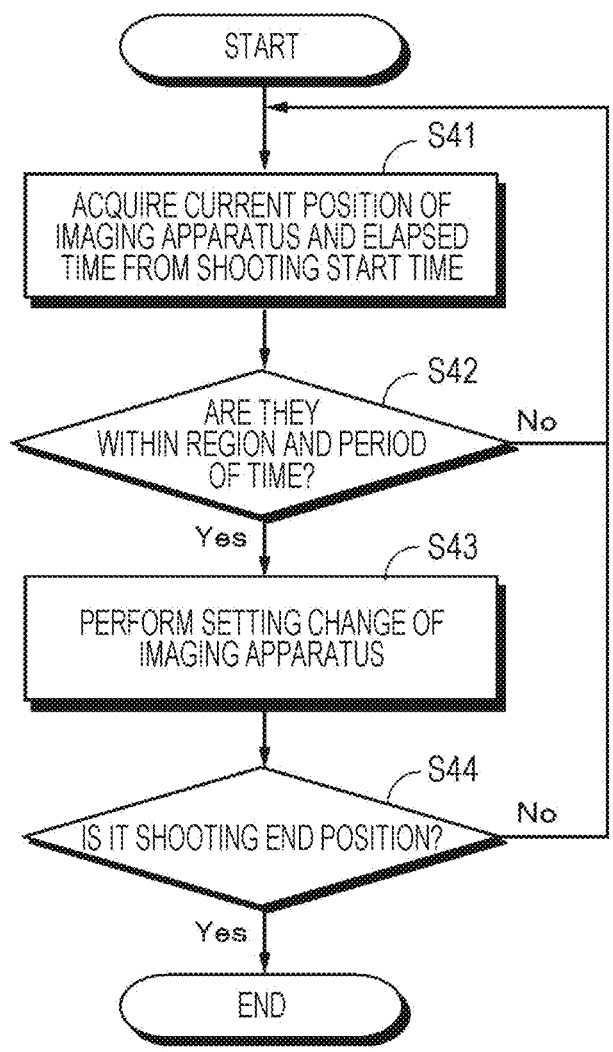
FIG. 7 is a flowchart illustrating a flow of setting change processing in the third embodiment.

The setting change processing of the third embodiment is described with reference to the flowchart of FIG. 7. This processing is performed by the information processing section 200.

First, in step S41, the current position of the imaging apparatus 100 and the elapsed time from shooting start time are acquired. This is processing similar to that of step S12 of the first embodiment.

Next, in step S42, it is determined whether the current position of the imaging apparatus 100 acquired in step S41 is in the region including the setting change position and the elapsed time from shooting start time is in the period of time including the setting change time. In a case where any of them is not satisfied, the processing returns to step S41, and steps S41 and S42 are repeated (No in step S42).

In a case where it is determined that the current position of the imaging apparatus 100 is in the region including the setting change position and the elapsed time from shooting start time is in the period of time including the setting change time in step S42, the processing proceeds to step S43 (Yes in step S42).

Then, the setting change processing is performed in step S43, and the setting of the imaging apparatus 100 is changed to the pre-registered setting. Next, in step S44, it is determined whether or not the position acquired in step S41 is the shooting end position. In a case where it is not the shooting end position, the processing proceeds to step S41, and steps S41 to S44 are repeated up to the shooting end position (No in step S44). Meanwhile, in a case where the position acquired in step S41 is the shooting end position, the processing ends (Yes in step S44).

The setting change processing in the third embodiment is performed in the above manner. According to the third embodiment, because the setting change position and the setting change time have a range, even if an error occurs between the movements of the imaging apparatus 100 in rehearsal and actual shooting, such an error is permitted and the setting change processing of the imaging apparatus 100 can be performed. Thus, the movement speed and the position of the imaging apparatus 100 can be adjusted in actual shooting, and it is possible to achieve shooting with higher degree of freedom while performing the setting change processing. Furthermore, the setting change processing can be executed even in a case where the imaging apparatus 100 cannot be moved in a same manner as in the case of the rehearsal due to a change of a shooting target, shooting environments, or the like.

4. Fourth Embodiment

[4-1. Setting Change Processing of Imaging Apparatus]

Next, the fourth embodiment of the present technology is described. The fourth embodiment is based on the third embodiment. In a case where the current position of the imaging apparatus 100 is in the region including the setting change position and the elapsed time from shooting start time is in the period of time including the setting change time, the user is notified of a request to give an instruction of setting change execution of the imaging apparatus 100. Then, the information processing section 200, in a case of receiving an instruction of setting change execution from the user, performs the setting change processing. The setting change processing is automatically performed in the first to third embodiments. However, in the fourth embodiment, the setting change processing is performed in a case where an instruction of setting change execution is given from the user. Note that the setting information, the setting change position, and the setting change time may be registered in either the first embodiment or the second embodiment.

Figure 8:
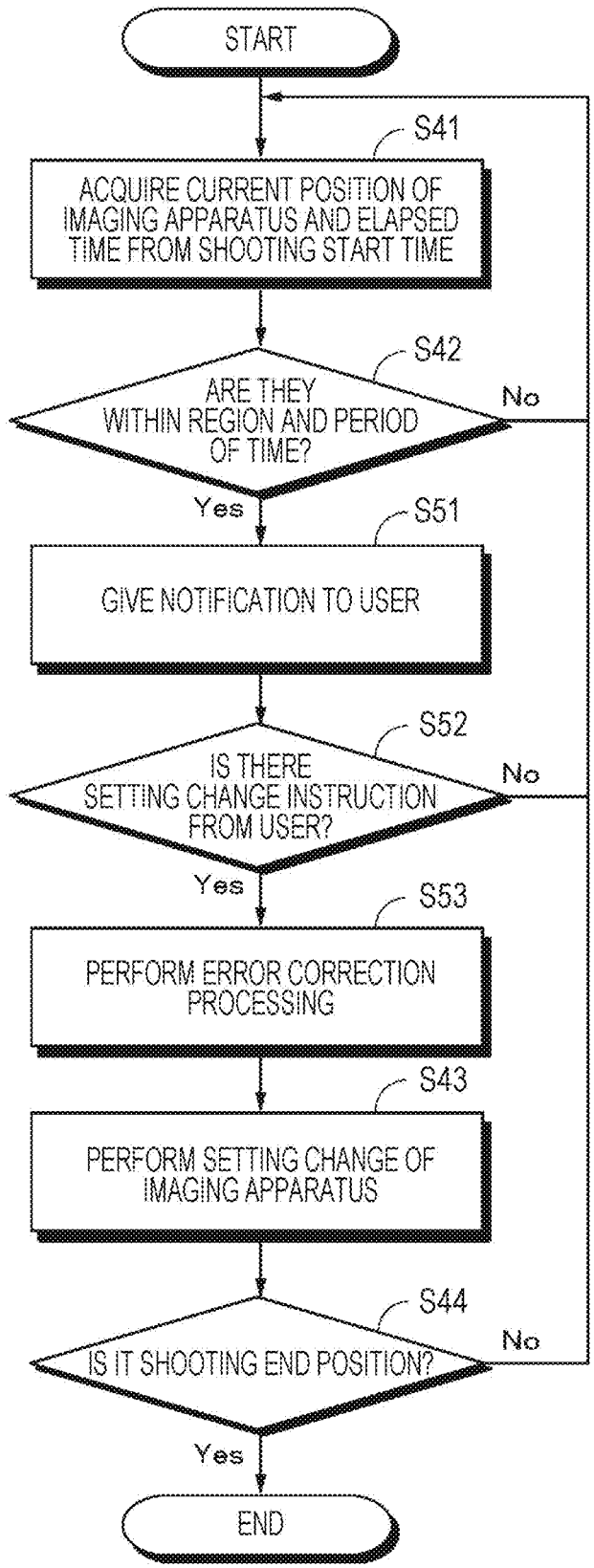
FIG. 8 is a flowchart illustrating a flow of setting change processing in a fourth embodiment.

The setting change processing of the fourth embodiment is described with reference to the flowchart of FIG. 8. This processing is performed by the information processing section 200. Note that the same flow is cited for the processing that is the same as that of the third embodiment, and description will be omitted.

First, in step S41, the information processing section 200 acquires the current position of the imaging apparatus 100 and the elapsed time from shooting start time. Next, in step S42, it is determined whether the current position of the imaging apparatus 100 acquired in step S41 is in the region including the setting change position and the elapsed time from shooting start time is in the period of time including the setting change time.

In a case where it is determined that the current position of the imaging apparatus 100 is in the region including the setting change position and the elapsed time from shooting start time is in the period of time including the setting change time in step S42, the processing proceeds to step S51 (Yes in step S42).

In step S51, the user is notified of a request to give an instruction of setting change execution of the imaging apparatus 100 with respect to the user. This notification is to urge the user to give an instruction of setting change execution. For example, this can be achieved when a predetermined message or mark is displayed on the display section 108 of the imaging apparatus 100. The information processing section 200 performs processing to transmit data of a message or mark to be displayed and a control signal for display control to the control section 101.

Furthermore, this notification can be achieved by methods including turning on a light of the imaging apparatus 100, outputting a predetermined message as a voice from a speaker of the imaging apparatus 100, and vibrating the imaging apparatus 100 itself, in addition to displaying on the display section 108. The notification may be made using one of the methods alone or a combination thereof. Any method may be used insofar as the user is urged to give an instruction of setting change execution.

Next, in step S52, it is determined whether or not the instruction of setting change execution has been given by the user. In a case where the instruction of setting change execution has not been given by the user, step S52 is repeated until the instruction is given (No in step S52). Note that in this case another notification may be given to the user.

In a case where the instruction of setting change execution is given by the user, the processing proceeds to step S53 (Yes in step S52). Next, in step S53, error correction processing that corrects a difference between the setting change time and time indicated by the instruction of the setting change execution from the user is performed.

Here, the error correction processing of step S53 is described. For example, it is assumed that the instruction of setting change execution is given by the user upon reception of the notification at position B after two seconds from the elapsed time from record start time indicated by the setting change time. In this case, two seconds are added (delay for two seconds) to the setting change time at every setting change position at and after position B. Furthermore, for example, it is assumed that the instruction of setting change execution is given by the user upon reception of the notification at position B before two seconds from the elapsed time from record start time indicated by the setting change time. In this case, two seconds are subtracted (moving up by two seconds) from the setting change time at every setting change position at and after position B.

Thus, it is possible to prevent an error between the setting change time corresponding to position B and time at which the setting change processing is performed from being accumulated and affecting the setting change position at and after position B. For example, in a case where the instruction of setting change execution is given by the user upon reception of the notification at position B after two seconds from the elapsed time from record start time, the time used for movement of the imaging apparatus 100 from position B to position C is shorten by two seconds unless error correction is performed. Thus, shooting is performed at time intervals that differ from those of the rehearsal.

The case is considered in which the instruction of setting change execution is given by the user upon reception of the notification at position B after two seconds from the elapsed time from record start time and moreover the instruction of setting change execution is given by the user at position C with a delay of four seconds from the error-corrected "setting change time+2 seconds". In this case, four seconds are added (delay for four seconds) at the setting change position at and after position C. This means that a total of six seconds are added (delay for six seconds) to the initial setting change time at points at and after position C.

Furthermore, the case is considered in which the instruction of setting change execution is given by the user upon reception of the notification at position B after two seconds from the elapsed time from record start time indicated by the setting change time and moreover the instruction of setting change execution is given by the user at position C three seconds before the error-corrected "setting change time+2 seconds". In this case, three seconds are subtracted (moving up by three seconds) at the setting change position at and after position C. This means that a total of one second is subtracted (moving up by one second) from the initial setting change time at points at and after position C.

The flowchart is described again. The setting change processing is performed in step S43, and the setting of the imaging apparatus 100 is changed to the pre-registered setting. This is processing similar to that of step S43 of the third embodiment. Next, in step S44, it is determined whether or not the current position of the imaging apparatus 100 acquired in step S41 is the shooting end position. In a case where it is not the shooting end position, the processing proceeds to step S41, and steps S41 to S44 are repeated up to the shooting end position (No in step S44). Meanwhile, in a case where the current position of the imaging apparatus 100 acquired in step S41 is the pre-registered shooting end position, the processing ends (Yes in step S44).

The setting change processing in the fourth embodiment is performed in the above manner. According to the fourth embodiment, even if the imaging apparatus 100 moves in the actual shooting at a speed different from that in the rehearsal, it is possible to perform the setting change of the imaging apparatus 100 depending on a change in speed. Note that in the third embodiment and the fourth embodiment, the setting change position may have a range and the setting change time may not have a range. Furthermore, in contrast, the setting change position may not have a range and the setting change time may have a range.

The above is the first to fourth embodiments of the present technology. The present technology can be applied to any shooting with movement of the imaging apparatus 100. In addition to a case where a person (camera man) holds the imaging apparatus in hand or carries the imaging apparatus to move the imaging apparatus, application can be made to a shooting method in which the imaging apparatus is mounted on a slider that moves on a rail, a shooting method in which the imaging apparatus 100 is mounted on a movable body, e.g., an automobile, a train, a drone, or the like, a method of mounting the imaging apparatus on a crane, or the like.

A train in principle travels to pass a predefined position at predefined time along the schedule. Therefore, it is considered to apply the present technology to the imaging apparatus mounted on the first carriage of the train. When the present technology is used, for example, such that camera shake correction is turned on at a position with a harsh curve ten minutes after departure (shooting start time) so as to be able to shoot a video with less shake even when the train joggles. Furthermore, when the present technology is used such that the settings of white balance, exposure, a built-in ND filter, and the like are changed at a position of entering a tunnel 20 minutes after departure (shooting start time) so as to be able to prevent occurrence of blown-out highlights or blocked-up shadows at a time of entering or leaving the tunnel.

The similar application is made to an automobile that travels to pass through a predefined position at predefined time or travels to pass through a predefined position at predefined time by automatic driving.

The first embodiment is particularly useful for shooting with none or less difference in time and position, e.g., for the shooting method in which the imaging apparatus is mounted on a slider that moves on a rail. Furthermore, the third embodiment and the fourth embodiment are particularly useful for shooting having a high possibility of occurrence of a difference in time and position in such a way that a person holds and moves the imaging apparatus. However, the use of each of the embodiments is not limited by an aspect of shooting.

Furthermore, some of the first to fourth embodiments may be used in a single shooting. For example, in shooting with a total of five setting change positions, the first embodiment is used from shooting start to the second setting change position, and the third embodiment is used from the third to fifth setting change positions. This is, for example, a case where shooting environments are largely changed in a middle of the shooting course, and the imaging apparatus 100 can be positioned at the setting change position at an accurate position and time up to the second setting change position, but that is difficult at and after the third setting change position.

5. User Interface

Next, description is given of an example of a user interface for registration of the setting information, the setting change position, and the setting change time of the imaging apparatus 100 and for giving the instruction of setting change execution. In the aforementioned embodiments, input of the above is performed on the hardware button, which is the input section 109 of the imaging apparatus 100. However, input to the hardware button is not necessary in a case where the user interface is used.

Furthermore, in the embodiments, description is given to indicate that the imaging apparatus 100 is practically moved to the setting change position in order to register the setting change position. However, it is not necessary in rehearsal to move the imaging apparatus 100 to a position, which is the setting change position, in a case where the setting change position is registered using the user interface.

Figure 9:
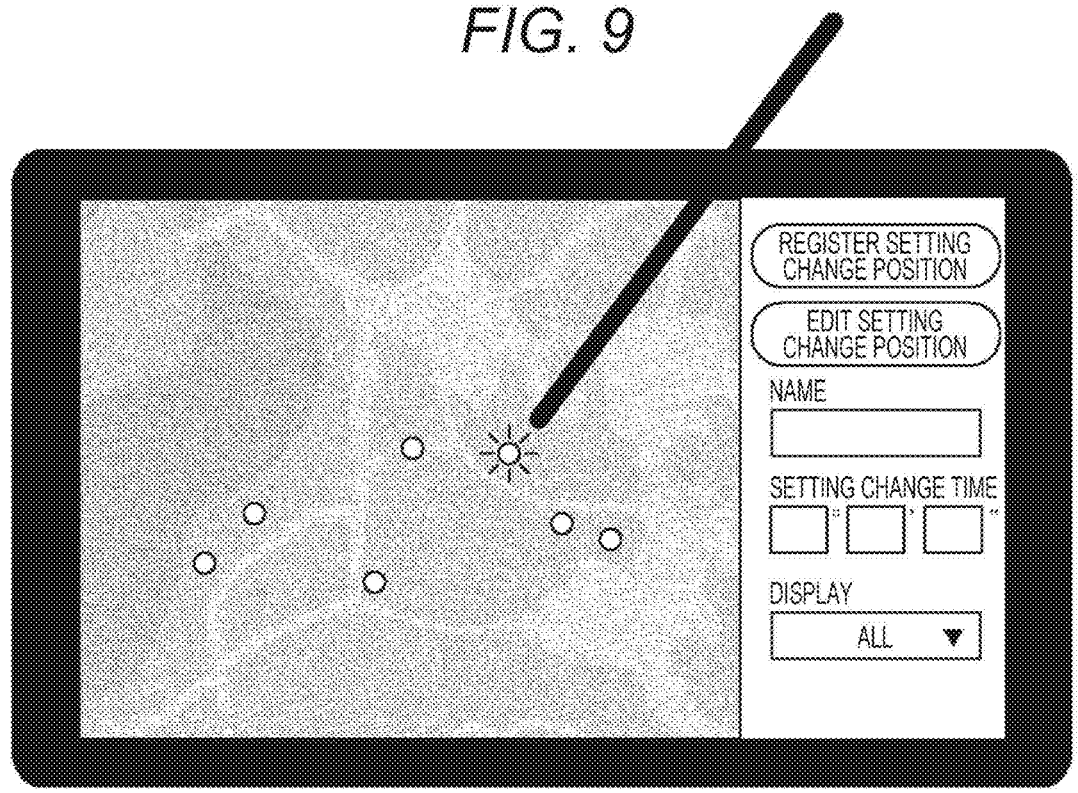
FIG. 9 is a diagram illustrating an example of a user interface.

First, referring to FIG. 9, the user interface for registration of the setting change position and the setting change time is described.

The user interface of FIG. 9 displays a map of a shooting location of a higher point of view. This map may be called by acquiring a current location of the imaging apparatus 100 by GPS or the like and using an existing map service on the basis of the position information. Furthermore, the map may be called from a map database through search of the name of location.

On the side of the map are displayed a setting change position registration button, a setting change position edit button, a name display frame, a setting change time frame, and a display menu button.

When input from the user is made on the setting change position registration button, the information processing section 200 registers the position of the imaging apparatus 100 at a point of time when the input is made, as the setting change position. The setting change position edit button is a button for the registered setting change position and can edit the registered setting change position when the input is made.

When input that specifies a position to be the setting change position is made on the map, the position is illuminated, and moreover when the setting change position registration button is pressed, the position can be registered as the setting change position.

When the display section 108 is a touch panel, input that specifies a position on the map can be performed such that a finger, a stylus, or the like is brought into a direct contact with the position. In a case where the display section 108 is not a touch panel, the input can be performed by a method such that, for example, a cursor is displayed on the map and the cursor is moved by input to the hardware button by the user, or a coordinate that indicates a position is input.

Similarly, regarding the registered setting change position, when input that specifies the position is performed and then the setting change position registration button is pressed, the position can be registered as new setting change position (it is possible to register a plurality of setting change positions at the same location).

The example illustrated in FIG. 9 is a state in which six setting change positions and setting change times are already registered and a position, which is not yet the setting change position, is specified and this position is registered as a new setting change position. In the case of this state, the setting change position edit button, which is a button for the already registered setting change position, is invalid. In a case where the existing setting change position is selected, both a setting change position addition button and the setting change position edit button are valid.

The name display frame is to give a name to each setting change position. The setting change time frame is to input and register setting change time corresponding to each setting change position, which is the setting change position.

Figure 10:
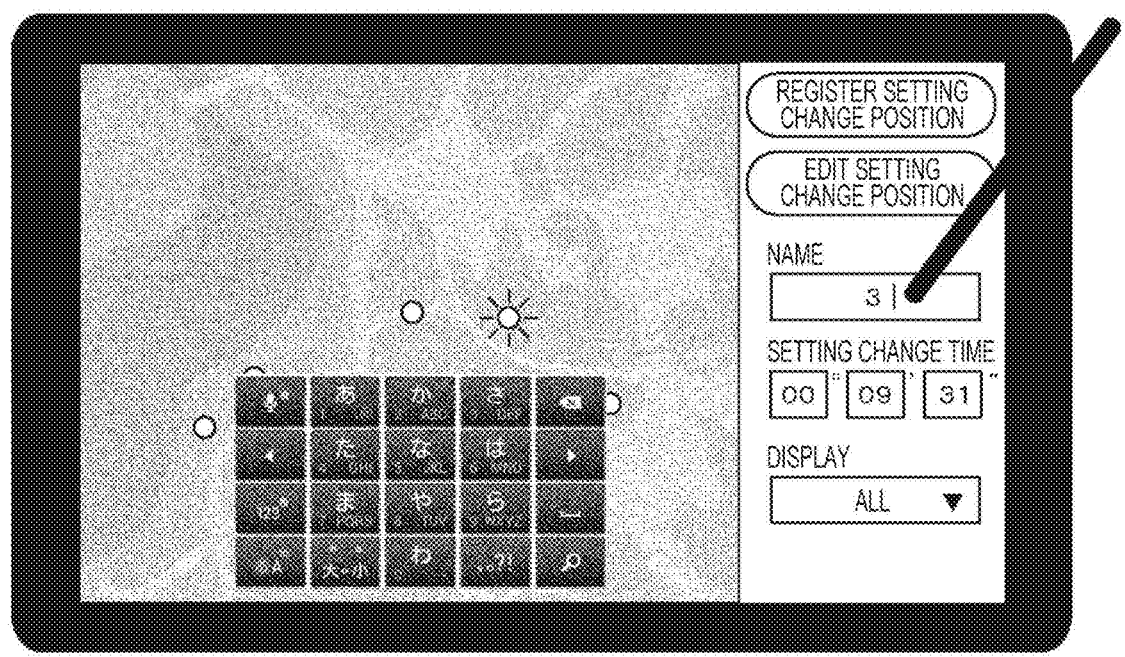
FIG. 10 is a diagram illustrating an example of a user interface.

In a case where the registered setting change position is selected and input is performed on the setting change position edit button, the setting change position becomes a selected state, which differs from the display aspect of the other setting change positions (e.g., a change in color, lighting, or a change in shading). Then, as illustrated in FIG. 10, in this selected state, the name of the setting change position and the corresponding setting change time can be input.

When the name display frame is selected into an input mode, a keyboard is displayed on the screen, and alphabetic characters, Japanese characters, numerical numbers, symbols and the like can be input. Note that the keyboard to be displayed may be displayed anywhere on the screen at any position at which the keyboard does not become an obstacle. Furthermore, the user may specify and change the position of the keyboard. When the setting change time frame is selected into an input mode, only input of numerical numbers is accepted. As in the example of input of name, the keyboard of numerical numbers may be displayed on the screen, or numerical numbers may be selected within the setting change time frame.

Figure 11A:
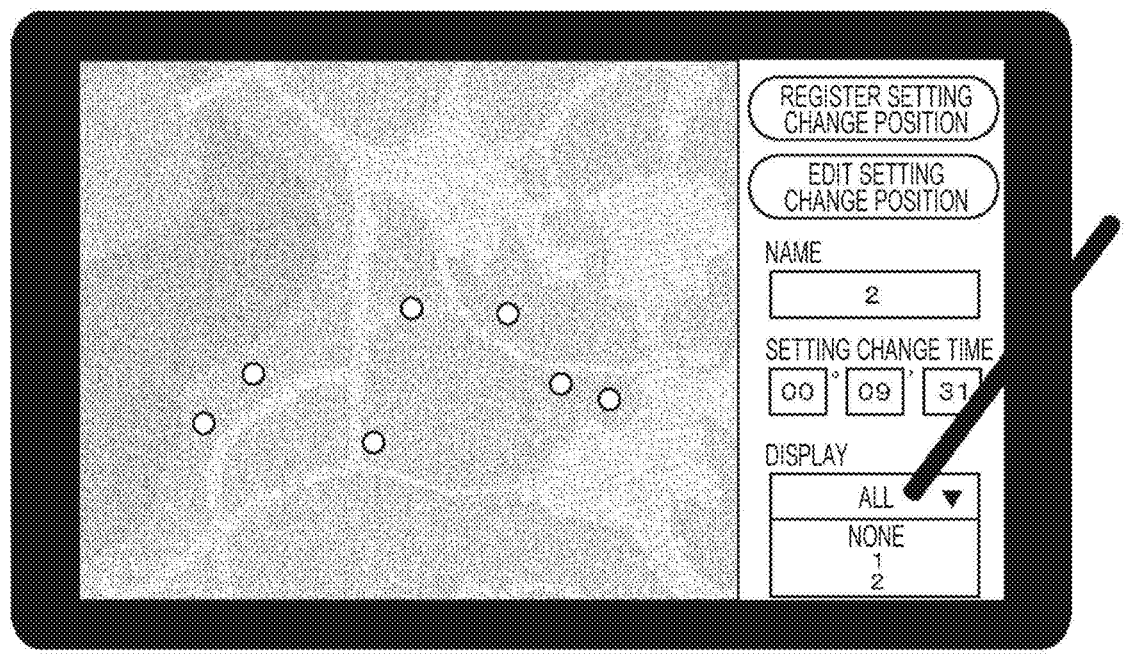
FIGS. 11A and 11B are diagrams illustrating an example of a user interface.

The display menu button is to selectively display the registered setting change position on the map in a superimposed manner. When the input is made on the display menu button, as illustrated in FIG. 11A, the names of the registered setting change positions are displayed, for example, in a pulldown display method, in addition to "all" and "none".

Note that the order of display of the names of the setting change positions is reordered according to the time of registration.

Figure 11B:
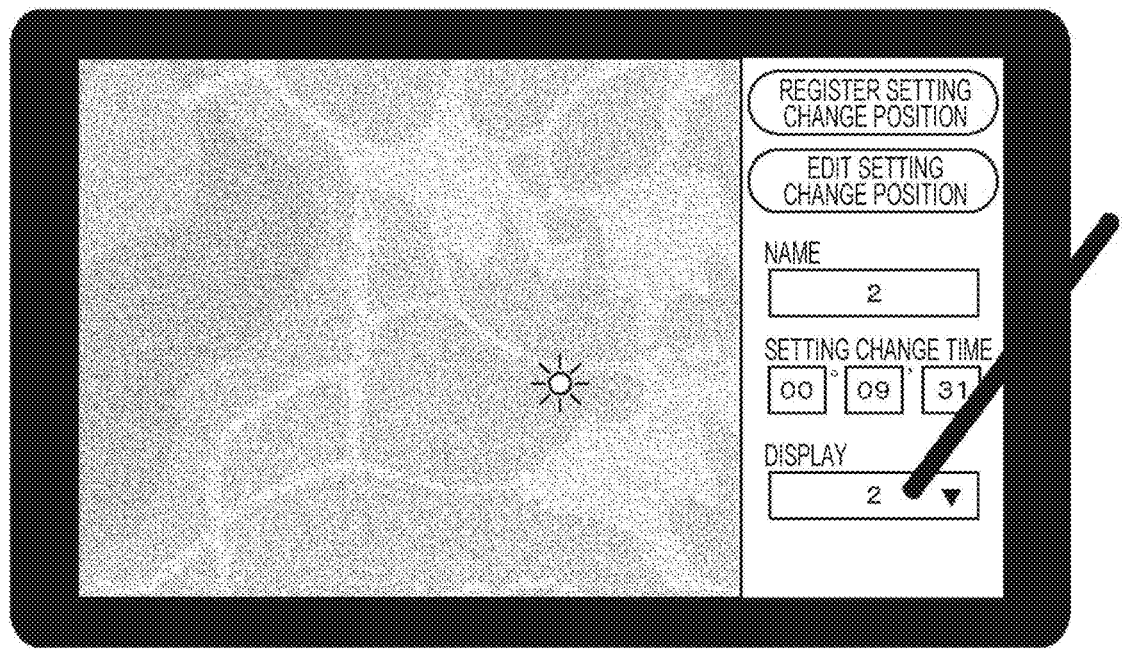

In a case where "all" is selected, all the registered setting change positions are displayed on the map, and in a case where "none" is selected, all the setting change positions are hidden. Furthermore, when the name of a setting change position is selected, the selected setting change position is displayed on the map. In the example of FIG. 11B, setting change position 2 is selected.

For example, in a case where a new setting change position is registered in a position close to the registered setting change position, it can be used in a case where visibility is favorable when the registered setting change position is hidden.

Figure 12:
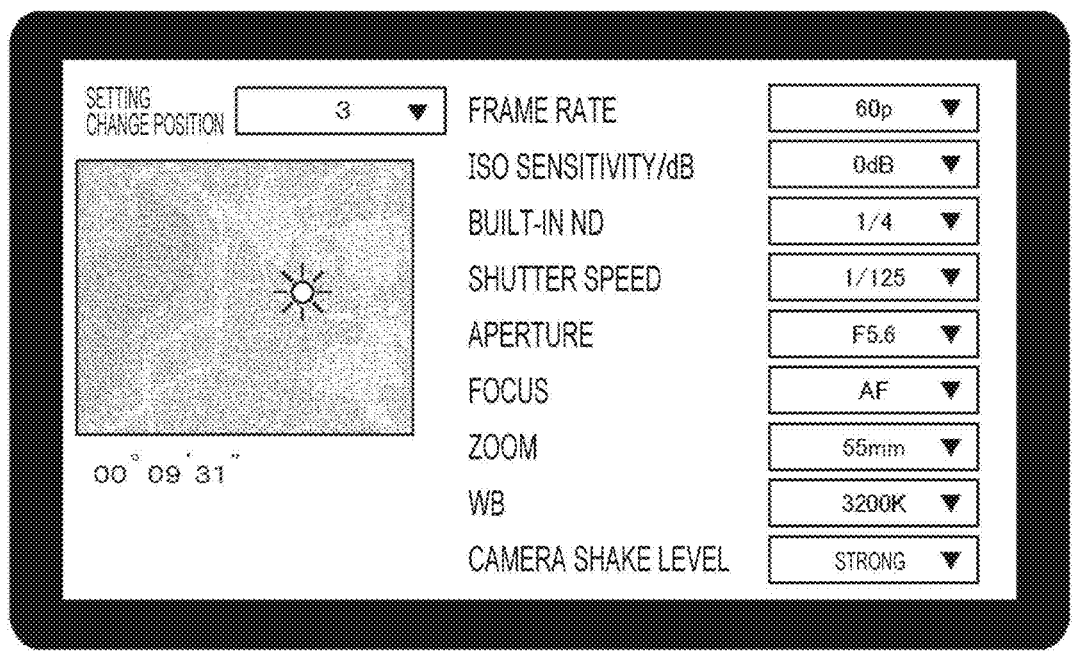
FIG. 12 is a diagram illustrating an example of a user interface.

FIG. 12 is an example of the user interface for registration of the setting information of the imaging apparatus 100. In the example of FIG. 12, the map is displayed on the left side in the drawing, and the items of the setting information corresponding to the selected setting change position are displayed on the right side in the drawings. The setting change time corresponding to the position on the map is displayed as information of the selected setting change position. For each piece of the setting information, a parameter can be selected in pulldown display, and the user can select a desired value to register the setting information. Note that the user may input a specific value with the keyboard illustrated in FIG. 10. Note that the items of the setting information illustrated here are mere examples, and other settings of the imaging apparatus 100 may be the setting information.

Figure 13:
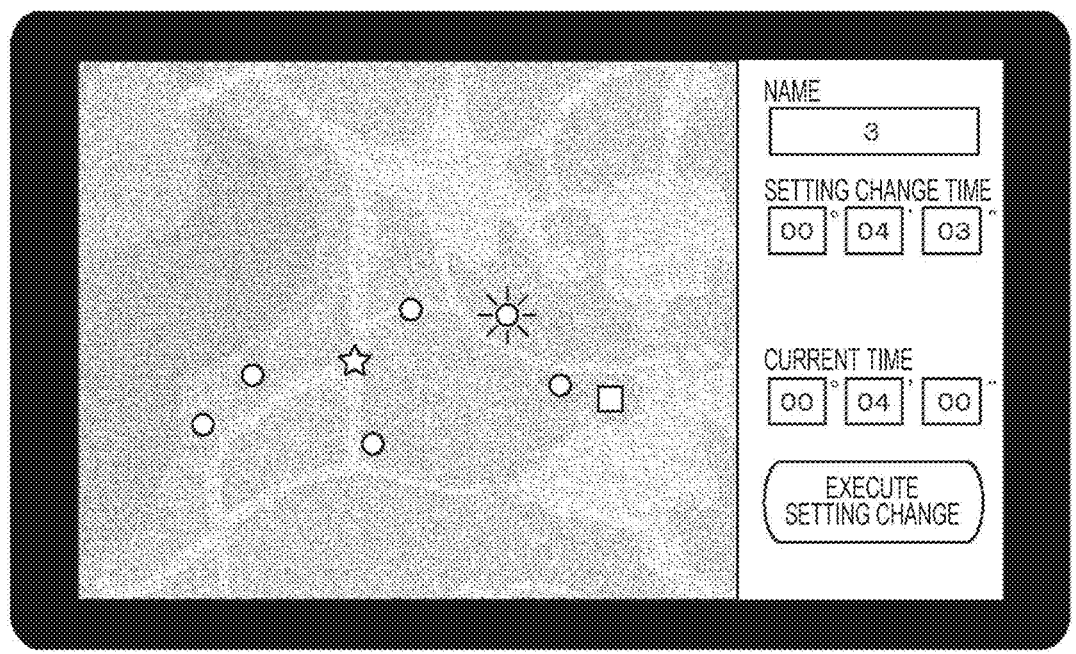
FIG. 13 is a diagram illustrating an example of a user interface.

FIG. 13 is an example of the user interface with which the user gives an instruction of setting change execution described in the fourth embodiment. In this example, a setting change execution button is provided in addition to the map, the setting change position on the map, the name of the setting change position, the setting change time, and the current time. When the input is made on the setting change execution button by the user, the setting change processing of the imaging apparatus 100 is performed by the information processing section 200.

On the map of FIG. 13, the star icon indicates the current position of the imaging apparatus 100, the circular icons indicate the setting change positions for which setting reproduction has already been done, the flashing indicates a next setting change position, and the square icon indicates the other shooting setting point.

Normally, the information (name and setting change time) of a next setting change position is displayed, and in a case where the imaging apparatus 100 comes close to the next setting change position, the setting change execution button is displayed. When the user performs input to the setting change execution button, the information processing section 200 performs the setting change processing of the imaging apparatus 100. Note that the display of the setting change position may be distinguished by color, shading, or the like, not by the shape of icon described above.

In this way, the user interface using the present technology is configured. Note that the arrangement on the screen of each configuration of the user interface, e.g., the map or the button, is not limited to the aspects illustrated in the drawings, but any aspect may be possible insofar as configurations necessary for the use of the present technology are displayed.

Note that the aforementioned user interface may be used for input of the setting change time of the second embodiment.

6. Modification

Heretofore, the embodiments of the present technology have been described in detail, but the present technology is not limited to the aforementioned embodiments, but various modifications on the basis of the technical idea of the present technology may be made.

The present technology can be applied not only to cameras for business used, for example, for shooting of movie films or television programs, but also to commercially available digital video cameras or digital cameras. Furthermore, in addition to cameras, the present technology can also be applied to any apparatuses with a camera function including a smartphone, a portable telephone, a portable game console, a network camera, an in-vehicle camera, a surveillance camera, a laptop, a tablet terminal, a wristwatch type wearable terminal, and a spectacle-type wearable terminal. Furthermore, the present technology can also be applied not only to video shooting, but also to still image shooting.

A person who performs shooting with the imaging apparatus may be different from a person who gives a registration instruction and an instruction of setting change execution. Furthermore, the information processing apparatus may be operated, not by the imaging apparatus, but by a different apparatus (e.g., a personal computer or a tablet terminal) that can transmit or receive data with respect to the imaging apparatus. For example, first, the imaging apparatus is connected via a network, a wire, or the like, with a personal computer having a function as the information processing apparatus to enable data to be transmitted and received. The position information and the time information of the imaging apparatus are fed to the personal computer. Then, a camera man performs rehearsal and actual shooting with the imaging apparatus, and an assistant performs a registration instruction, an instruction of setting change execution, or the like with the personal computer. The personal computer determines whether the setting change position has been reached at the point of time when the setting change time has elapsed from the fed time information and position information, and in the case of reaching or in a case where the instruction of setting change execution has been given, transmits a control signal to the imaging apparatus to change the setting. The imaging apparatus that has received the control signal from the personal computer performs a setting change.

In this way, in a case where the imaging apparatus and a different apparatus are used, the aforementioned user interface is displayed on the display section of the different apparatus. Note that the user interface may be displayed on both the imaging apparatus and the different apparatus.

Furthermore, in a case where the imaging apparatus and the different apparatus are connected to enable data to be transmitted and received and the position information of the imaging apparatus is fed to the different apparatus (e.g., a smartphone), it is possible for the different apparatus to notify the user of the fact that the imaging apparatus is separated from the different apparatus by a predetermined distance or more. In this way, this enables use for security purposes such as loss prevention or theft prevention of the imaging apparatus. Furthermore, in a case where an external server is further added as the different apparatus and the position information of the imaging apparatus and the position information of the smartphone are fed to the external server, and in a case where the imaging apparatus is separated in position from the smartphone by a predetermined distance or more, the external server may give a notification to the smartphone.

The embodiments describe that the setting change time is the elapsed time from shooting start time, but the setting change time may be the elapsed time from the setting change position to a next setting change position on the shooting course.

The embodiments describe the setting change processing of the imaging apparatus 100 is performed in a case where the setting change position is reached at the point of time when the setting change time is reached. However, the setting change processing may be performed in the case of one of the point of time when the setting change time is reached and the point of time when the setting change position is reached.

The second embodiment describes that the setting change position is registered first and then the setting change time is registered. However, in contrast, the setting change time may be registered first and the setting change position may be registered.

The notification to the user in the fourth embodiment may be performed not only by the display on the display section 108 of the imaging apparatus 100, but by a voice output from a speaker or the like, display on a display apparatus of a housing different from the imaging apparatus 100, or the like. For example, when a notification is given to the display of the housing different from the imaging apparatus 100, the assistant of the camera man who performs shooting with the imaging apparatus 100 can check the notification on the display of the different housing to give an instruction of setting change execution.

The present technology may also be used in the medical field. For example, equipment corresponding to the position information acquisition section 201 according to the present technology is carried by a medical personnel (e.g., a doctor or a nurse) or mounted on an apparatus owned by the medical personnel, and position information of the medical personnel is fed to the different apparatus (external server) or the like to specify the position of the medical personnel. In this way, for example, it is possible to increase security at a hospital or the like in which medical information, medicines, or the like are obtained only in a case where the medical personnel has visited a specific location.

Furthermore, equipment corresponding to the position information acquisition section 201 according to the present technology is carried by the medical personnel (e.g., a doctor or a nurse) or mounted on an apparatus owned by the medical personnel, and furthermore the position information acquisition section 201 is also provided on medical equipment. Then, the position information of the medical personnel and the medical equipment may be transmitted to an apparatus, e.g., an external server, and processing of matching the information of the medical personnel and the medical equipment within a predetermined range may be performed. Thus, for example, it is possible to perform management such that a specific medical personnel only can use specific medical equipment.

Furthermore, equipment corresponding to the position information acquisition section 201 according to the present technology is carried by a patient or mounted on an apparatus owned by the patient, and furthermore the position information acquisition section 201 is also provided on a specific location, facility, equipment, or the like. Then, the position information of the patient and the specific location, facility, equipment, or the like may be transmitted to an apparatus, e.g., an external server, and processing of matching the information of the patient and the specific location, facility, equipment, or the like within a predetermined range may be performed. Thus, for example, it is possible to obtain information of the patient who has visited a specific location, and only the patient who has visited a specific location can receive medicines or the like or use the equipment at the specific location.

7. Application Example

The technology according to the present disclosure is applicable to a variety of products. For example, the technology according to the present disclosure may be implemented as devices mounted on any type of movable bodies such as automobiles, electric vehicles, hybrid electric vehicles, motorcycles, bicycles, personal mobilities, airplanes, drones, ships, robots, construction machines, and agricultural machines (tractors).

Figure 14:
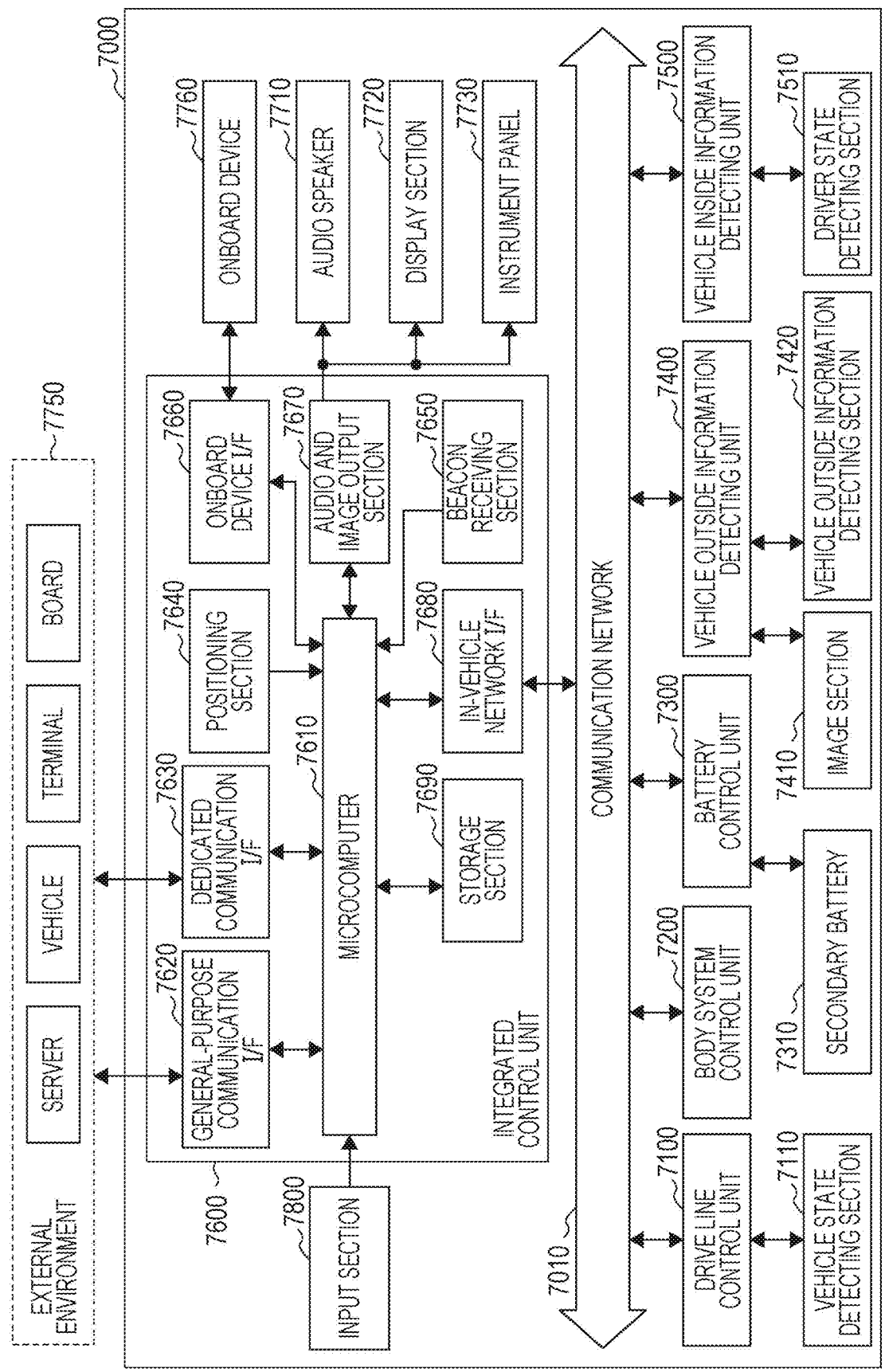
FIG. 14 is a block diagram illustrating an example of a schematic configuration of a vehicle control system.

FIG. 14 is a block diagram illustrating a schematic configuration example of a vehicle control system 7000, which is an example of a movable body control system, to which the technology according to the present disclosure can be applied. The vehicle control system 7000 includes a plurality of electronic control units connected via a communication network 7010. In the example illustrated in FIG. 14, the vehicle control system 7000 includes a drive line control unit 7100, a body system control unit 7200, a battery control unit 7300, a vehicle outside information detecting unit 7400, a vehicle inside information detecting unit 7500, and an integrated control unit 7600. The communication network 7010, which connects the plurality of control units, may be an in-vehicle communication network such as a controller area network (CAN), a local interconnect network (LIN), a local area network (LAN), or FlexRay (registered trademark) that is compliant with any standard.

Each control unit includes a microcomputer that performs arithmetic processing in accordance with a variety of programs, a storage section that stores the programs, parameters used for the variety of operations, or the like executed by the microcomputer, and a driving circuit that drives devices subjected to various types of control. Each control unit includes a network I/F used to communicate with the other control units via the communication network 7010, and a communication I/F used to communicate with devices, sensors, or the like outside and inside the vehicle through wired communication or wireless communication. FIG. 14 illustrates a microcomputer 7610, a general-purpose communication I/F 7620, a dedicated communication I/F 7630, a positioning section 7640, a beacon receiving section 7650, an onboard device I/F 7660, an audio and image output section 7670, an in-vehicle network I/F 7680, and a storage section 7690 as the functional configuration of the integrated control unit 7600. Each of the other control units similarly includes a microcomputer, a communication I/F, a storage section, and the like.

The drive line control unit 7100 controls the operation of devices related to the drive line of the vehicle in accordance with a variety of programs. For example, the drive line control unit 7100 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like. The drive line control unit 7100 may have the function of a control device for an antilock brake system (ABS), an electronic stability control (ESC), or the like.

The drive line control unit 7100 is connected to a vehicle state detecting section 7110. The vehicle state detecting section 7110 includes, for example, at least one of sensors such as a gyro sensor that detects the angular velocity of the axial rotating motion of the vehicle body, an acceleration sensor that detects the acceleration of the vehicle, or a sensor that detects the operation amount of the accelerator pedal, the operation amount of the brake pedal, the steering wheel angle of the steering wheel, the engine speed, the wheel rotation speed, or the like. The drive line control unit 7100 uses a signal input from the vehicle state detecting section 7110 to perform arithmetic processing, and controls the internal combustion engine, the driving motors, the electric power steering device, the braking device, or the like.

The body system control unit 7200 controls the operations of a variety of devices attached to the vehicle body in accordance with a variety of programs. For example, the body system control unit 7200 functions as a control device for a keyless entry system, a smart key system, a power window device, or a variety of lights such as a headlight, a backup light, a brake light, a blinker, or a fog lamp. In this case, the body system control unit 7200 can receive radio waves transmitted from a portable device that serves instead of the key or signals of a variety of switches. The body system control unit 7200 accepts input of these radio waves or signals, and controls the vehicle door lock device, the power window device, the lights, or the like.

The battery control unit 7300 controls a secondary battery 7310, which is a power supply source for a drive motor, in accordance with a variety of programs. For example, the battery control unit 7300 receives information such as the battery temperature, the battery output voltage, or the remaining battery capacity from a battery device including the secondary battery 7310. The battery control unit 7300 uses these signals to perform arithmetic processing, and performs temperature adjusting control on the secondary battery 7310 or controls a cooling device or the like included in the battery device.

The vehicle outside information detecting unit 7400 detects information regarding the outside of the vehicle including the vehicle control system 7000. For example, the vehicle outside information detecting unit 7400 is connected to at least one of an imaging section 7410 or a vehicle outside information detecting section 7420. The imaging section 7410 includes at least one of a time of flight (ToF) camera, a stereo camera, a monocular camera, an infrared camera, or other cameras. The vehicle outside information detecting section 7420 includes, for example, at least one of an environment sensor that detects the current weather, or a surrounding information detecting sensor that detects another vehicle, an obstacle, a pedestrian, or the like around the vehicle including the vehicle control system 7000.

The environment sensor may be, for example, at least one of a raindrop sensor that detects rainy weather, a fog sensor that detects a fog, a sunshine sensor that detects the degree of sunshine, or a snow sensor that detects a snowfall. The surrounding information detecting sensor may be at least one of an ultrasonic sensor, a radar device, or a light detection and ranging/laser imaging detection and ranging (LIDAR) device. These imaging section 7410 and vehicle outside information detecting section 7420 may be installed as independent sensors or devices, or as a device into which a plurality of sensors or devices are integrated.

Figure 15:
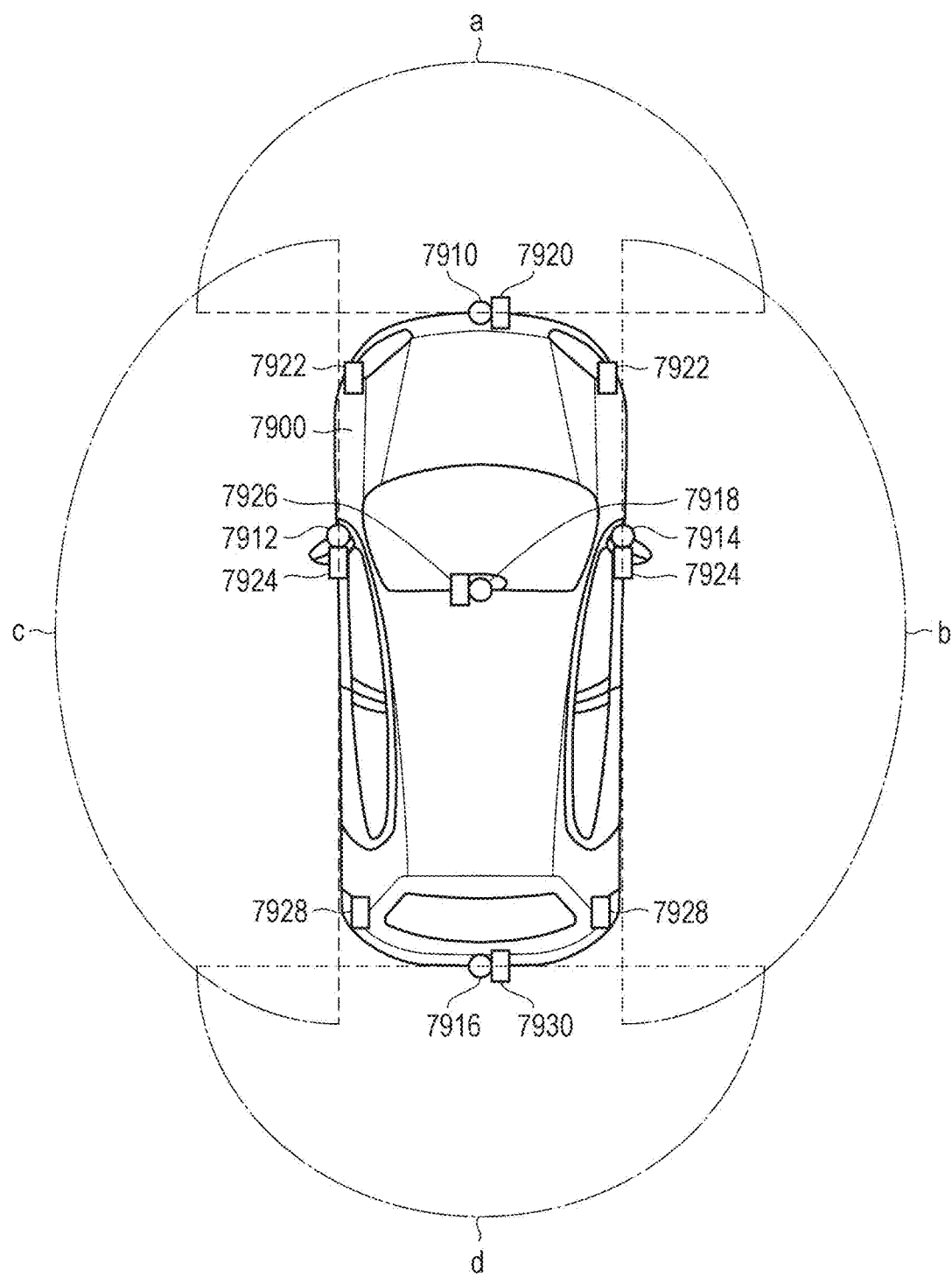
FIG. 15 is an explanatory diagram illustrating an example of installation positions of a vehicle outside information detecting section and an imaging section.

Here, FIG. 15 illustrates an example of installation positions of the imaging section 7410 and the vehicle outside information detecting section 7420. Imaging sections 7910, 7912, 7914, 7916, and 7918 are positioned, for example, at least one of the front nose, a side mirror, the rear bumper, the back door, or the upper part of the windshield in the vehicle compartment of a vehicle 7900. The imaging section 7910 attached to the front nose and the imaging section 7918 attached to the upper part of the windshield in the vehicle compartment chiefly acquire images of the area ahead of the vehicle 7900. The imaging sections 7912 and 7914 attached to the side mirrors chiefly acquire images of the areas on the sides of the vehicle 7900. The imaging section 7916 attached to the rear bumper or the back door chiefly acquires images of the area behind the vehicle 7900. The imaging section 7918 attached to the upper part of the windshield in the vehicle compartment is used chiefly to detect a preceding vehicle, a pedestrian, an obstacle, a traffic light, a traffic sign, a lane, or the like.

Note that FIG. 15 illustrates an example of the respective imaging ranges of the imaging sections 7910, 7912, 7914, and 7916. An imaging range a represents the imaging range of the imaging section 7910 attached to the front nose. Imaging ranges b and c respectively represent the imaging ranges of the imaging sections 7914 and 7912 attached to the side mirrors. An imaging range d represents the imaging range of the imaging section 7916 attached to the rear bumper or the back door. For example, overlaying image data captured by the imaging sections 7910, 7912, 7914, and 7916 offers an overhead image that looks down on the vehicle 7900.

Vehicle outside information detecting sections 7920, 7922, 7924, 7926, 7928, and 7930 attached to the front, the rear, the sides, the corners, and the upper part of the windshield in the vehicle compartment of the vehicle 7900 may be, for example, ultrasonic sensors or radar devices. The vehicle outside information detecting sections 7920, 7926, and 7930 attached to the front nose, the rear bumper, the back door, and the upper part of the windshield in the vehicle compartment of the vehicle 7900 may be, for example, LIDAR devices. These vehicle outside information detecting sections 7920 to 7930 are used chiefly to detect a preceding vehicle, a pedestrian, an obstacle, or the like.

The description will continue with reference to FIG. 14 again. The vehicle outside information detecting unit 7400 causes the imaging section 7410 to capture images of the outside of the vehicle, and receives the captured image data. Furthermore, the vehicle outside information detecting unit 7400 receives detection information from the connected vehicle outside information detecting section 7420. In a case where the vehicle outside information detecting section 7420 is an ultrasonic sensor, a radar device, or a LIDAR device, the vehicle outside information detecting unit 7400 causes ultrasound, radio waves, or the like to be transmitted, and receives the information of the received reflected waves. The vehicle outside information detecting unit 7400 may perform processing of detecting an object such as a person, a car, an obstacle, a traffic sign, or a letter on a road, or processing of detecting the distance on the basis of the received information. The vehicle outside information detecting unit 7400 may perform environment recognition processing of recognizing a rainfall, a fog, a road condition, or the like on the basis of the received information. The vehicle outside information detecting unit 7400 may compute the distance to an object outside the vehicle on the basis of the received information.

Furthermore, the vehicle outside information detecting unit 7400 may perform image recognition processing of recognizing a person, a car, an obstacle, a traffic sign, a letter on a road, or the like, or processing of detecting the distance on the basis of the received image data. The vehicle outside information detecting unit 7400 may perform distortion correcting processing, alignment processing, or the like on the received image data, and combine image data captured by a different imaging section 7410 to generate an overhead view or a panoramic image. The vehicle outside information detecting unit 7400 may use the image data captured by the other imaging section 7410 to perform viewpoint converting processing.

The vehicle inside information detecting unit 7500 detects information of the inside of the vehicle. The vehicle inside information detecting unit 7500 is connected, for example, to a driver state detecting section 7510 that detects the state of the driver. The driver state detecting section 7510 may include a camera that images the driver, a biological sensor that detects biological information of the driver, a microphone that picks up a sound in the vehicle compartment, or the like. The biological sensor is attached, for example, to a seating face, the steering wheel, or the like, and detects biological information of the passenger sitting on the seat or the driver gripping the steering wheel. The vehicle inside information detecting unit 7500 may compute the degree of the driver's tiredness or the degree of the driver's concentration or determine whether the driver has a doze, on the basis of detection information input from the driver state detecting section 7510. The vehicle inside information detecting unit 7500 may perform processing such as a noise cancelling process on the picked-up audio signal.

The integrated control unit 7600 controls the overall operation inside the vehicle control system 7000 in accordance with a variety of programs. The integrated control unit 7600 is connected to an input section 7800. The input section 7800 is implemented as a device such as a touch panel, a button, a microphone, a switch, or a lever on which a passenger can perform an input operation. Data obtained when a voice input by a microphone is voice-recognized may be input to the integrated control unit 7600. The input section 7800 may be, for example, a remote control device that uses infrared light or other radio waves, or an external connection device such as a mobile telephone or a personal digital assistant (PDA) corresponding to the operation of the vehicle control system 7000. The input section 7800 may be, for example, a camera. In that case, a passenger can input information through gesture. Alternatively, data obtained when the motion of a wearable device worn on the passenger may be input. Moreover, the input section 7800 may include an input control circuit or the like that generates an input signal, for example, on the basis of information input by a passenger or the like using the above-described input section 7800, and outputs the generated input signal to the integrated control unit 7600. The passenger or the like operates this input section 7800, thereby inputting various types of data to the vehicle control system 7000 or instructing the vehicle control system 7000 about a processing operation.

The storage section 7690 may include a read only memory (ROM) that stores a variety of programs to be executed by a microcomputer, and a random access memory (RAM) that stores a variety of parameters, arithmetic results, sensor values, or the like. Furthermore, the storage section 7690 may be implemented as a magnetic storage device such as a hard disk drive (HDD), a semiconductor storage device, an optical storage device, a magneto-optical storage device, or the like.

The general-purpose communication I/F 7620 is a general-purpose communication I/F that mediates in communication between a variety of devices in an external environment 7750. The general-purpose communication I/F 7620 may implement a cellular communication protocol such as global system of mobile communications (GSM) (registered trademark), WiMAX (registered trademark), long term evolution (LTE) (registered trademark) or LTE-advanced (LTE-A), or other wireless communication protocols such as a wireless LAN (which is also referred to as Wi-Fi (registered trademark)), or Bluetooth (registered trademark). The general-purpose communication I/F 7620 may be connected to a device (such as an application server or a control server) on an external network (such as the Internet, a cloud network, or a network specific to a service provider), for example, via a base station or an access point. Furthermore, the general-purpose communication I/F 7620 may be connected to a terminal (such as a terminal of a driver, a pedestrian or a store, or a machine type communication (MTC) terminal) in the vicinity of the vehicle, for example, using the peer-to-peer (P2P) technology.

The dedicated communication I/F 7630 is a communication I/F that supports a communication protocol defined for the purpose of use for vehicles. The dedicated communication I/F 7630 may implement a standard protocol such as wireless access in vehicle environment (WAVE), which is a combination of IEEE 802.11p for the lower layer and IEEE 1609 for the upper layer, dedicated short range communications (DSRC), or a cellular communication protocol. The dedicated communication I/F 7630 typically performs V2X communication. The V2X communication is a concept including one or more of vehicle-to-vehicle communication, vehicle-to-infrastructure communication, vehicle-to-home communication, and vehicle-to-pedestrian communication.

The positioning section 7640 receives, for example, global navigation satellite system (GNSS) signals (such as global positioning system (GPS) signals from a GPS satellite) from a GNSS satellite for positioning, and generates position information including the latitude, longitude, and altitude of the vehicle. Note that the positioning section 7640 may also identify the current position by exchanging signals with a wireless access point, or acquire position information from a terminal such as a mobile phone, a PHS, or a smartphone that has a positioning function.

The beacon receiving section 7650 receives radio waves or electromagnetic waves, for example, from a wireless station or the like installed on the road, and acquires information such as the current position, traffic congestion, closed roads, or necessary time. Note that the function of the beacon receiving section 7650 may be included in the above-described dedicated communication I/F 7630.

The onboard device I/F 7660 is a communication interface that mediates in connections between the microcomputer 7610 and a variety of devices 7760 in the vehicle. The onboard device I/F 7660 may use a wireless communication protocol such as a wireless LAN, Bluetooth (registered trademark), near field communication (NFC), or a wireless USB (WUSB) to establish a wireless connection. Furthermore, the onboard device I/F 7660 may also establish a wired connection, e.g., a universal serial bus (USB), a high-definition multimedia interface (HDMI (registered trademark)) or mobile high-definition link (MHL) via a connection terminal (and a cable if necessary), which is not illustrated. The onboard devices 7760 may include, for example, at least one of a mobile device of a passenger, a wearable device of a passenger, or an information device carried into or attached to the vehicle. Furthermore, the onboard devices 7760 may include a navigation device that searches a route to any destination. The onboard device I/F 7660 exchanges control signals or data signals with the onboard devices 7760.

The in-vehicle network I/F 7680 is an interface that mediates in communication between the microcomputer 7610 and the communication network 7010. The in-vehicle network I/F 7680 transmits and receives signals or the like in compliance with a predetermined protocol supported by the communication network 7010.

The microcomputer 7610 of the integrated control unit 7600 controls the vehicle control system 7000 in accordance with a variety of programs on the basis of information acquired via at least one of the general-purpose communication I/F 7620, the dedicated communication I/F 7630, the positioning section 7640, the beacon receiving section 7650, the onboard device I/F 7660, or the in-vehicle network I/F 7680. For example, the microcomputer 7610 may calculate a control target value of the driving force generating device, the steering mechanism, or the braking device on the basis of acquired information regarding the inside and outside of the vehicle, and output a control instruction to the drive line control unit 7100. For example, the microcomputer 7610 may perform cooperative control for the purpose of executing the functions of the advanced driver assistance system (ADAS) including vehicle collision avoidance or impact reduction, follow-up driving based on the inter-vehicle distance, constant vehicle speed driving, automatic driving, or vehicle lane deviation warning. Furthermore, the microcomputer 7610 may perform cooperative control for the purpose of automatic driving or the like for autonomous running without depending on the driver's operation through control of the driving force generating device, the steering mechanism, the braking device, or the like on the basis of information around the vehicle to be acquired.

The microcomputer 7610 may create local map information including surrounding information regarding the current position of the vehicle by producing three-dimensional distance information between the vehicle and a subject including a surrounding structure, person, or the like, on the basis of information acquired via at least one of the general-purpose communication I/F 7620, the dedicated communication I/F 7630, the positioning section 7640, the beacon receiving section 7650, the onboard device I/F 7660, or the in-vehicle network I/F 7680. Furthermore, the microcomputer 7610 may predict danger such as vehicle collisions, approaching pedestrians or the like, or entry to closed roads on the basis of acquired information, and generate a warning signal. The warning signal may be, for example, a signal used to generate a warning sound or turn on the warning lamp.

The audio and image output section 7670 transmits an output signal of at least one of a sound or an image to an output device capable of visually or aurally notifying a passenger of the vehicle or the outside of the vehicle of information. In the example of FIG. 14, an audio speaker 7710, a display section 7720, and an instrument panel 7730 are exemplified as the output device. For example, the display section 7720 may include at least one of an onboard display or a head-up display. The display section 7720 may have an augmented reality (AR) display function. The output device may also be a device other than these devices like a headphone, a wearable device, e.g., a spectacle-type display worn on the passenger, a projector, or a lamp. In a case where the output device is a display device, the display device visually displays a result obtained by the microcomputer 7610 performing a variety of processing or information received from another control unit in a variety of forms such as text, images, tables, or graphs. Furthermore, in a case where the output device is an audio output device, the audio output device converts audio signals including reproduced audio data, acoustic data, or the like into analog signals, and aurally outputs the analog signals.

Note that in the example illustrated in FIG. 14, at least two control units connected via the communication network 7010 may be integrated into a single control unit. Alternatively, the individual control units may include a plurality of control units. Moreover, the vehicle control system 7000 may also include another control unit that is not illustrated. Furthermore, a part or the whole of the functions executed by any of the control units may be executed by another control unit in the above description. That is, as long as information is transmitted and received via the communication network 7010, predetermined arithmetic processing may be performed by any of the control units. Similarly, a sensor or a device connected to any of the control units may be connected to another control unit, and the plurality of control units may transmit and receive detection information to and from each other via the communication network 7010.

Note that a computer program for implementing individual functions of the information processing section 200 corresponding to the information processing apparatus according to the present embodiments described with reference to FIG. 1 can be implemented in any of the control units, or the like. Furthermore, it is also possible to provide a computer readable recording medium storing such a computer program. The recording medium is, for example, a magnetic disk, an optical disk, a magneto-optical disk, a flash memory, or the like. Furthermore, the above computer program may be delivered via a network, for example, without using a recording medium.

In the vehicle control system 7000 described above, the information processing apparatus according to the present embodiment may be applied to the vehicle 7900 of the application example illustrated in FIG. 14. For example, the imaging apparatus 100 including the information processing section 200 and the position information acquisition section 201 corresponding to the information processing apparatus is provided on the vehicle 7900, and the position information acquisition section 201 acquires the current position of the vehicle 7900 and feeds the position information to the information processing section 200. Then, the setting change processing of the imaging apparatus 100 is performed similarly to the first to fourth embodiments depending on the position of the vehicle 7900.

Furthermore, application may be made not only to the imaging apparatus, but also to various setting changes of the vehicle 7900 itself. The position information acquisition section 201 acquires the position of the vehicle 7900, and a change of the type of light, a change of the level of light, a change of air conditioning setting, a change of running speed and the like of the vehicle 7900 are performed depending on the position.

Thus, for example, when the vehicle 7900 arrives at a preset, predetermined tourist spot, it is possible to automatically change the various settings of the imaging apparatus 100 or the vehicle 7900, for example, light, air conditioning, running speed, or the like, to settings suitable for the tourist spot in advance. Note that various settings after changes of the imaging apparatus 100 or the vehicle 7900, e.g., light, air conditioning, running speed, or the like may be preset by the user, or may be acquired through reception from a cloud service provided by a manufacturer of the vehicle 7900, a manufacturer of the imaging apparatus 100, or the like, or a cloud service used by the user itself, or the like.

Furthermore, in a case where the vehicle 7900 is a rental car, there is also a use method in which the user uploads various settings for vehicle specific to the user onto a cloud service or the like in advance, the various settings of the vehicle are downloaded from the cloud and applied to the vehicle 7900 when the vehicle 7900, which is a rental car, reaches a preset, predetermined position.

Furthermore, in a case where the vehicle 7900, which is a rental car, includes the imaging apparatus 100, there is also a use method in which the user uploads various settings of the imaging apparatus 100 specific to the user onto the cloud service in advance, and the settings of the imaging apparatus 100 are downloaded from the cloud when the vehicle 7900 reaches a preset, predetermined position, and applied.

Furthermore, the current position of the vehicle 7900 may be acquired with the position information acquisition section 201 directly mounted on the vehicle 7900 or by the imaging apparatus 100 including the position information acquisition section 201, and the position information may be fed to a smartphone or the like of the user, who is the owner of the vehicle 7900. Thus, the position of the vehicle 7900 can be notified to the user, who is the owner, and therefore it is possible to assist the user to search the vehicle 7900, for example, at a parking.

Furthermore, the current position of the vehicle 7900 may be acquired with the position information acquisition section 201 directly mounted on the vehicle 7900 or by the imaging apparatus 100 including the position information acquisition section 201, and the position information may be fed to a smart lock or the like of the user, who is the owner of the vehicle 7900. The smart lock is a general term of a device and a system that brings a key into a communicable state to perform opening/closing and management using a device, e.g., a smartphone. Thus, it is possible to operate the smart lock only in a case where the vehicle 7900 is present within a predetermined range near the user. The key of the vehicle 7900 can be opened only in a case where the user is present near the vehicle 7900 and cannot be opened in a case where the user is not present nearby. This can be used, for example, for a car sharing service or the like.

Furthermore, the current position of the user may be acquired by the position information acquisition section mounted on the smartphone of the user or the like, and the position information may be fed to the information processing section 200 of the imaging apparatus 100 mounted on the vehicle 7900. In this way, it is possible to change various settings of the imaging apparatus 100 that operate the imaging apparatus 100 depending on the position of the user. For example, usage is possible such that the imaging apparatus 100 mounted on the vehicle 7900 may start shooting with a predetermined setting when the user is separated from the vehicle 7900 by a predetermined distance, and the surrounding area of the vehicle 7900 is monitored.

Furthermore, when the current position of the vehicle 7900 is acquired with the position information acquisition section 201 directly mounted on the vehicle 7900 or by the imaging apparatus 100 including the position information acquisition section 201, it is possible to grasp a drive history of the vehicle 7900 by the user, the way of driving, the tendency of driving, or the like. Thus, it is possible to assess the driving (assess the driving skill) of the user.

Moreover, the assessment data of the driving of the user that can be obtained in the above manner may be fed to the smartphone or the like that is owned by the user. For example, it is also possible that the assessment data of the driving and biological information of the user recorded on the smartphone of the user are checked against each other so as to urge the user to take a break or a change with the smartphone during driving.

Furthermore, the information processing section 200 provided on the vehicle 7900 may change various settings of the vehicle 7900 on the basis of the assessment data of the driving of the user or may change various settings of the imaging apparatus 100 mounted on the vehicle 7900.

Furthermore, it is also possible to specify who is currently driving the vehicle 7900 on the basis of the assessment data of the driving of the user. With use the above, it is possible, for example, to set and change an automobile insurance fee depending on the assessment of the driving of the specified user (assessment of the driving skill).

The present technology may be configured as below.

(1)

An information processing apparatus in which, on the basis of a pre-registered setting change position and/or pre-registered setting change time, a setting of the imaging apparatus is changed to a pre-registered setting associated with the setting change position and/or the setting change time.

(2)

The information processing apparatus according to (1), in which the setting change position is a position of the imaging apparatus at a time of shooting by the imaging apparatus, and at the time of shooting, in a case where the imaging apparatus reaches the setting change position, the setting of the imaging apparatus is changed to a predefined setting.

(3)

The information processing apparatus according to (1) or (2), in which the setting change time is an elapsed time from shooting start time by the imaging apparatus, and at a time of shooting, at a point of time when the elapsed time from the shooting start time by the imaging apparatus reaches the setting change time, the setting of the imaging apparatus is changed to a predefined setting.

(4)

The information processing apparatus according to (1), in which the setting change position is a position of the imaging apparatus at a time of shooting by the imaging apparatus, the setting change time is an elapsed time from shooting start time by the imaging apparatus, and in a case where the imaging apparatus has reached the setting change position at a point of time when the elapsed time from the shooting start time by the imaging apparatus reaches the setting change time, the setting of the imaging apparatus is changed to a predefined setting.

(5)

The information processing apparatus according to any of (1) to (4), in which the setting change position and the setting change time are registered in association with the setting of the imaging apparatus by input of a user.

(6)

The information processing apparatus according to any of (1) to (5), in which before a time of shooting by the imaging apparatus, a position of the imaging apparatus at a point of time when a registration instruction is given by a user is registered as the setting change position.

(7)

The information processing apparatus according to (6), in which after registration of the setting change position, an elapsed time from shooting start time by the imaging apparatus, the elapsed time being input in association with the setting change position by the user, is registered as the setting change time.

(8)

The information processing apparatus according to any of (1) to (7), in which in a case where the imaging apparatus reaches within a region including a position of the imaging apparatus indicated by the setting change position, the setting of the imaging apparatus is changed to a predefined setting.

(9)

The information processing apparatus according to any of (1) to (8), in which in a case where the imaging apparatus reaches a position indicated by the setting change position within a period of time including an elapsed time from shooting start time by the imaging apparatus indicated by the setting change time, the setting of the imaging apparatus is changed to a predefined setting.

(10)

The information processing apparatus according to any of (1) to (9), in which in a case where the imaging apparatus reaches within a region including the setting change position within a period of time including an elapsed time from shooting start time by the imaging apparatus indicated by the setting change time, the setting of the imaging apparatus is changed to a predefined setting.

(11)

The information processing apparatus according to any of (1) to (10), in which in a case where the imaging apparatus reaches within a region including the setting change position within a period of time including an elapsed time from shooting start time by the imaging apparatus indicated by the setting change time, a notification is given to a user to perform input that gives an instruction of setting change of the imaging apparatus.

(12)

The information processing apparatus according to any of (1) to (11), in which the setting of the imaging apparatus is changed to a predefined setting upon reception of the input that gives the instruction of the setting change from the user.

(13)

The information processing apparatus according to (11), in which correction processing that corrects a difference between time when the input that gives the instruction of the setting change from the user is received and the setting change time is performed.

(14)

The information processing apparatus according to (13), in which in a case where the time when the input that gives the instruction of the setting change from the user is received is earlier than the setting change time, the setting change time is moved up by a difference between the time when the input is received and the setting change time.

(15)

The information processing apparatus according to (13), in which in a case where the time when the input that gives the instruction of the setting change from the user is received is later than the setting change time, the setting change time is delayed by a difference between the time when the input is received and the setting change time.

(16)

An information processing method including:

changing, on the basis of a pre-registered setting change position and/or pre-registered setting change time, a setting of the imaging apparatus to a pre-registered setting associated with the setting change position and/or the setting change time.

(17)

An information processing program causing a computer to execute an information processing method including changing, on the basis of a pre-registered setting change position and/or pre-registered setting change time, a setting of the imaging apparatus to a pre-registered setting associated with the setting change position and/or the setting change time.

REFERENCE SIGNS LIST

100 Imaging apparatus
200 Information processing section

The invention claimed is:

1. An information processing apparatus, comprising:
a central processing unit (CPU) configured to:
register, at a time of a first shooting by an imaging apparatus, a setting change time, wherein the setting change time is a first elapsed time from a start time of the first shooting;
determine, at a time of a second shooting by the imaging apparatus, a second elapsed time from a start time of the second shooting, wherein
the second elapsed time is equal to the setting change time, and
the time of the second shooting by the imaging apparatus is after the time of the first shooting by the imaging apparatus; and
change, at the second elapsed time that is equal to the setting change time, a setting of the imaging apparatus to a first specific setting associated with the setting change time.

2. The information processing apparatus according to claim 1, wherein the CPU is further configured to:
register, at the time of the first shooting, a setting change position, wherein the setting change position is a first position of the imaging apparatus at the time of the first shooting;
determine, at the setting change time, a second position of the imaging apparatus, wherein the second position is same as the setting change position; and
change, based on the imaging apparatus that is at the second position at the setting change time, the setting of the imaging apparatus to a second specific setting associated with the setting change position and the setting change time.

3. The information processing apparatus according to claim 2, wherein each of the setting change position and the setting change time is registered based on a user input.

4. The information processing apparatus according to claim 1, wherein the CPU is further configured to:
receive, at the time of the first shooting, a registration instruction from a user; and
register, based on the received registration instruction, a first position of the imaging apparatus as a setting change position.

5. The information processing apparatus according to claim 4, wherein the CPU is further configured to register, based on the received registration instruction, the first elapsed time as the setting change time, and the setting change time is registered after the registration of the setting change position.

6. The information processing apparatus according to claim 1, wherein the CPU is further configured to:
register, at the time of the first shooting, a setting change position of the imaging apparatus that indicates a first position of the imaging apparatus;
determine a second position of the imaging apparatus at the time of the second shooting, wherein the second position is within a region including the first position of the imaging apparatus; and
change, based on the imaging apparatus that is at the second position, the setting of the imaging apparatus to a second specific setting.

7. The information processing apparatus according to claim 1, wherein the CPU is further configured to:
register, at the time of the first shooting, a setting change position of the imaging apparatus that indicates a first position of the imaging apparatus;
determine, at the time of the second shooting, that the imaging apparatus reaches the first position within a period of time including the first elapsed time from the start time of the second shooting by the imaging apparatus; and
change, based on the imaging apparatus that reaches the first position within the period of time, the setting of the imaging apparatus to a second specific setting.

8. The information processing apparatus according to claim 1, wherein the CPU is further configured to:
register, at the time of the first shooting, a setting change position of the imaging apparatus;
determine, at the time of the second shooting, that the imaging apparatus reaches within a region including the setting change position within a period of time that includes the setting change time; and
change, based on the imaging apparatus that is within the region within the period of time, the setting of the imaging apparatus to a second specific setting.

9. The information processing apparatus according to claim 1, wherein the CPU is further configured to:
register, at the time of the first shooting, a setting change position of the imaging apparatus;
determine, at the time of the second shooting, that the imaging apparatus reaches within a region including the setting change position within a period of time that includes the setting change time; and
notify, based on the imaging apparatus that is within the region within the period of time, a user to input an instruction of setting change of the imaging apparatus.

10. The information processing apparatus according to claim 9, wherein the CPU is further configured to:
receive the input of the instruction based on the notification to the user; and
change, based on the received input of the instruction, the setting of the imaging apparatus to a second specific setting.

11. The information processing apparatus according to claim 9, wherein the CPU is further configured to:
correct a difference between a time of the reception of the input of the instruction and the setting change time.

12. The information processing apparatus according to claim 11, wherein
in a case where the time of the reception of the input of the instruction is earlier than the setting change time, the CPU is further configured to update the setting change time the difference between the time of the reception of the input of the instruction and the setting change time.

13. The information processing apparatus according to claim 11, wherein
in a case where the time of the reception of the input of the instruction is later than the setting change time, the CPU is further configured to delay the setting change time by the difference between the time of the reception of the input of the instruction and the setting change time.

14. An information processing method, comprising:
registering, at a time of a first shooting by an imaging apparatus, a setting change time, wherein the setting change time is a first elapsed time from a start time of the first shooting;
determining, at a time of a second shooting by the imaging apparatus, a second elapsed time from a start time of the second shooting, wherein
the second elapsed time is equal to the setting change time, and
the time of the second shooting by the imaging apparatus is after the time of the first shooting by the apparatus; and
changing, at the second elapsed time that is equal to the setting change time, a setting of the imaging apparatus to a specific setting associated with the setting change time.

15. A non-transitory computer-readable medium having stored thereon computer-executable instructions that, when executed by an information processing apparatus, cause the information processing apparatus to execute operations, the operations comprising:
registering, at a time of a first shooting by an imaging apparatus, a setting change time, wherein the setting change time is a first elapsed time from a start time of the first shooting;
determining, at a time of a second shooting by the imaging apparatus, a second elapsed time from a start time of the second shooting, wherein
the second elapsed time is equal to the setting change time, and
the time of the second shooting by the imaging apparatus is after the time of the first shooting by the apparatus; and
changing, at the second elapsed time that is equal to the setting change time, a setting of the imaging apparatus to a specific setting associated with the setting change time.

* * * * *